United States Patent
Strand et al.

(10) Patent No.: US 11,053,988 B2
(45) Date of Patent: Jul. 6, 2021

(54) POWERTRAIN SYSTEM ACTUATOR AND POWERTRAIN SYSTEM THEREWITH

(71) Applicant: MAGNA POWERTRAIN OF AMERICA, INC., Troy, MI (US)

(72) Inventors: Ryan Strand, Rochester Hills, MI (US); Wade Smith, Mussey, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 108 days.

(21) Appl. No.: 16/497,761

(22) PCT Filed: Mar. 28, 2018

(86) PCT No.: PCT/US2018/024706
§ 371 (c)(1),
(2) Date: Sep. 25, 2019

(87) PCT Pub. No.: WO2018/183409
PCT Pub. Date: Oct. 4, 2018

(65) Prior Publication Data
US 2021/0115984 A1  Apr. 22, 2021

Related U.S. Application Data

(60) Provisional application No. 62/477,952, filed on Mar. 28, 2017.

(51) Int. Cl.
*F16D 27/10* (2006.01)
*F16D 121/20* (2012.01)
(Continued)

(52) U.S. Cl.
CPC .......... *F16D 27/10* (2013.01); *F16D 2121/20* (2013.01); *F16D 2125/36* (2013.01);
(Continued)

(58) Field of Classification Search
CPC ................ F16D 27/10; F16D 2125/36; F16D 2500/1022; F16D 2500/1107; F16D 2127/02; F16D 2121/20; F16D 2500/501
See application file for complete search history.

(56) References Cited

U.S. PATENT DOCUMENTS 4,725,801 A    2/1988  Snyder
2010/0200358 A1*  8/2010  Eisengruber .......... F16D 41/125
                                                    192/41 S
(Continued)

FOREIGN PATENT DOCUMENTS

GB          2279125 A       12/1994

OTHER PUBLICATIONS

International Search Report and Written Opinion related to PCT/US2018/024706 dated Jul. 6, 2018.

*Primary Examiner* — David J Hlavka
(74) *Attorney, Agent, or Firm* — Dickinson Wright PLLC

(57) ABSTRACT

A vehicle powertrain system and powertrain actuator therefor is provided. The powertrain actuator selectively couples a first rotatable member to a second rotatable member to transfer torque therebetween and selectively decouples the first rotatable member from the second rotatable member to prevent the transfer of torque therebetween. The powertrain actuator includes a tubular cam assembly having a tubular first member and a tubular second member. The tubular first and second tubular members have end surfaces that interact with one another upon energizing a unidirectional solenoid. Upon a first energization of the solenoid, the first and second tubular members interact to operably couple the first and second rotatable members to allow torque to be transferred therebetween, and upon a second energization of the solenoid, the first and second tubular members interact to
(Continued)

selectively decouple the first the second rotatable members to prevent the transfer of torque therebetween.

20 Claims, 18 Drawing Sheets

(51) Int. Cl.
 *F16D 125/36* (2012.01)
 *F16D 127/02* (2012.01)
(52) U.S. Cl.
 CPC .. *F16D 2127/02* (2013.01); *F16D 2500/1022* (2013.01); *F16D 2500/1107* (2013.01); *F16D 2500/501* (2013.01)

(56) References Cited

U.S. PATENT DOCUMENTS

2012/0090952 A1* 4/2012 Lee .................. F16D 41/08
 192/41 R
2012/0145506 A1* 6/2012 Samie ................ F16D 41/125
 192/46

* cited by examiner

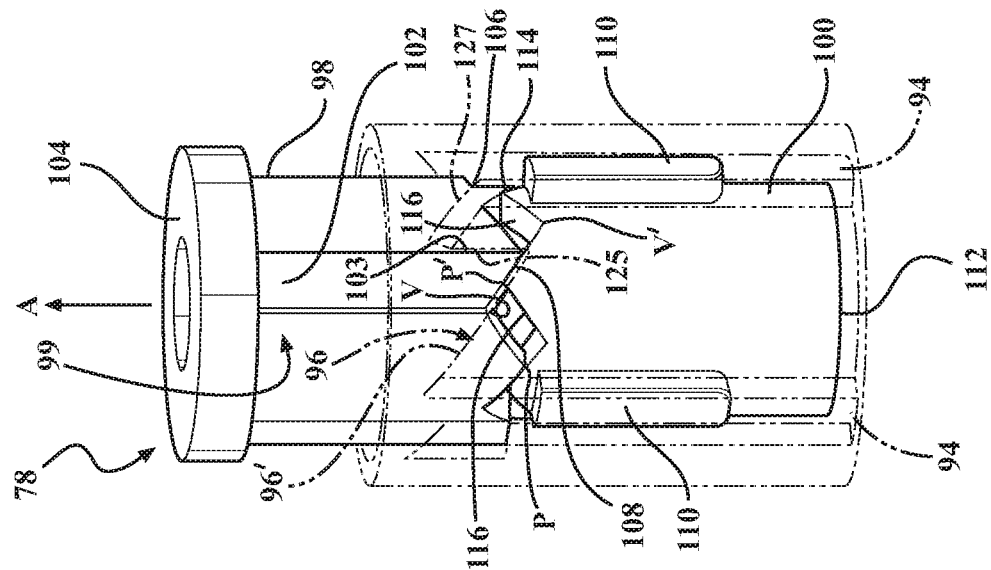
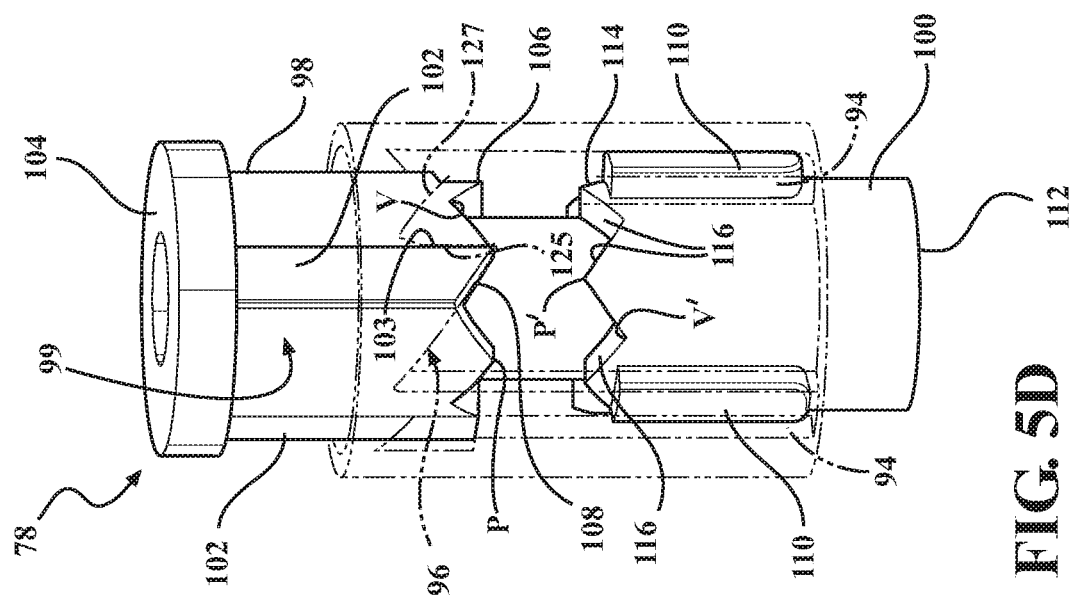
FIG. 5E
FIG. 5D

POWERTRAIN SYSTEM ACTUATOR AND POWERTRAIN SYSTEM THEREWITH

CROSS-REFERENCE TO RELATED APPLICATIONS

This application is a National Stage of International Application No. PCT/US2018/024706 filed Mar. 28, 2018, and titled "POWERTRAIN SYSTEM ACTUATOR AND POWERTRAIN SYSTEM THEREWITH," which claims the benefit of U.S. Provisional Application Ser. No. 62/477,952, filed Mar. 28, 2017, and titled "POWERTRAIN SYSTEM ACTUATOR AND POWERTRAIN SYSTEM THEREWITH". The entire disclosure of each of the above applications is incorporated herein by reference.

FIELD

The present disclosure relates generally to a powertrain system for a motor vehicle, and more particularly to an actuator for use in a powertrain system and which is operable for mechanically coupling and decoupling a pair of rotatable members.

BACKGROUND

This section provides background information related to this disclosure that is not necessarily prior art.

Powertrains of vehicles, such as automotive vehicles, for example, typically include a power transfer assembly having a pair of rotatable members configured to be brought into operably coupled engagement with one another, such that one of the members causes the other of the members to rotate, and to be brought into decoupled relation with one another, such that one of the members can rotate while the other of the members remains stationary. Some such power transfer assemblies of the type used in vehicle powertrains include transmissions, transfer cases, power take-off units and disconnectable axles. Regardless of the specific location/application, a torque transfer device and a power-operated actuator are typically incorporated into the power transfer assembly to selectively couple and decouple the rotatable members. Actuators are commonly configured to cause a shift member associated with the torque transfer device to translate linearly between an activated and deactivated state. While in one of the activated and deactivated states, the rotatable members can be coupled with one another via the shift member for co-rotation, and while in the other of the activated and deactivated states, the rotatable members can be decoupled from one another to allow one relative rotation between the rotatable members.

To facilitate movement of the shift member between the activated and deactivated states, it is known to provide an actuator that is electronically actuatable. Although known electronically actuatable actuators can prove effective in bringing the rotatable members into and out of coupled engagement with one another, they are typically required to be continuously energized in order to maintain the rotatable members in at least one of the coupled or decoupled states, and in some case both states. The need for the actuator to be continuously energized while in at least one of the states can prove problematic, both from a functional standpoint and a performance standpoint. For example, from the functional standpoint, should the source of energy be inadvertently interrupted for any reason, the intended state of operation of the rotatable members may be compromised. In another example, from the performance standpoint, the need for a constant supply of energy to the actuator while in at least one of its states inherently imparts a drain on other systems of the vehicle, and further yet, diminishes the vehicle's fuel economy. Further yet, by having to be constantly energized in at least one of the operable states, the overall useful life of the actuator can be decreased.

A powertrain actuator and powertrain system constructed in accordance with the various aspects disclosed herein overcomes at least those drawbacks discussed above, and likely others, as will be readily appreciated by one possessing ordinary skill in the art of powertrain systems and actuators therefor.

SUMMARY

This section provides a general summary of the disclosure and is not intended to be a complete listing of all of its features and embodiments.

In accordance with an aspect of the present disclosure, a vehicle powertrain system and powertrain actuator are provided. The powertrain actuator is operable to selectively couple a first rotatable member to a second rotatable member associated with a torque transfer device to transfer torque therebetween, and is further operable to selectively decouple the first rotatable member from the second rotatable member to prevent the transfer of torque therebetween. The powertrain actuator includes a tubular cam assembly having a tubular first member and a tubular second member. The tubular first and second tubular members have end surfaces that interact with one another upon energization of a solenoid. Upon a first energization of the solenoid, the first and second tubular members interact to operably couple the first and second rotatable members to allow torque to be transferred therebetween. Upon a second energization of the solenoid, the first and second tubular members interact to selectively decouple the first and second rotatable members to prevent the transfer of torque therebetween.

In accordance with another aspect of the disclosure, the vehicle powertrain actuator includes a solenoid fixed to a wall bounding a cavity. The solenoid has a plunger extending between a proximal end and a distal end, with the proximal end being configured for communication with an electrically activatable coil to cause the plunger to translate in the cavity. A tubular sleeve is fixed in the cavity, with the tubular sleeve having a throughbore with a guide member and a cam lock feature. A tubular first member is disposed in the tubular sleeve about the plunger, with the tubular first member having a first guide feature configured for translation along the guide member and having a first engagement end with a cam surface. A tubular second member is disposed in the tubular sleeve about the plunger, with the tubular second member having a second guide feature configured for translation along the guide member and having a second activation end configured to abut the first engagement end of the tubular first member. A first spring member is disposed within the tubular first and second members to bias the first and second members away from one another. The plunger is translatable toward the electrically activatable coil upon a first energizing of the coil. During the first actuation, the tubular first and second members translate from a retracted, deactivated position in the cavity with the first and second guide features translating along the guide member with the first guide feature becoming extended axially beyond the guide member, whereupon the second activation end rotatably drives the first and second guide features out of axial alignment with one another and drives a stop surface of the tubular first member into engagement with the cam lock feature so as to maintain the tubular first member in an axially translated, extended activated position when the coil is de-energized. A second energization of the coil causes the tubular first and second members to translate in the sleeve, whereupon the second activation end drives the stop surface of the tubular first member out of engagement with the cam lock feature and brings the first guide feature into axial alignment with the guide member, thereby allowing the tubular first member to be axially translated back to its retracted, deactivated position when the coil is de-energized.

In accordance with a further aspect of the disclosure, a second spring member is disposed about the plunger between the tubular first member and the proximal end of the plunger to facilitate axial translation of the tubular first member back to its retracted, deactivated position when the coil is de-energized.

In accordance with a further aspect of the disclosure, a third spring member is disposed in abutment with the proximal end of the plunger to facilitate axial translation of the tubular first member back to its retracted, deactivated position when the coil is de-energized.

In accordance with a further aspect of the disclosure, the plunger of the solenoid is uni-directionally actuatable to move in a first axial direction via electrical power, thereby negating the need maintain power to the solenoid on full time basis.

In accordance with a further aspect of the disclosure, the first engagement end and the second activation end are provided with inclined cam surfaces configured to abut one another to drive the first and second guide features into and out of axial alignment with one another and to drive the stop surface of the tubular first member into and out of engagement with the cam lock feature.

In accordance with a further aspect of the disclosure, a vehicle powertrain actuator in accordance with the disclosure is provided and includes a housing having a wall bounding a cavity and a through window. An electrically activatable coil is disposed adjacent the cavity. A plunger is disposed in the cavity. The plunger has an elongate portion extending between a proximal end adjacent the coil and a distal end. The proximal end is configured for magnetic communication with the electrically activatable coil to cause the plunger to translate in the cavity in response to magnetic communication. A tubular sleeve is fixedly disposed in the cavity. The tubular sleeve has a throughbore extending between open opposite ends. The throughbore has a guide member extending axially between the open opposite ends and a cam lock feature spaced radially adjacent the guide member. A tubular first member is disposed in the throughbore of the tubular sleeve and about the elongate portion of the plunger. The tubular first member has an outer surface with a first guide feature configured for translation along the guide member. The outer surface extends between a free end facing the proximal end of the plunger and a first engagement end facing the distal end of the plunger. The first engagement end has a cam surface and a stop surface extending therefrom. A tubular second member is disposed in the throughbore of the tubular sleeve about the elongate portion of the plunger between the tubular first member and the distal end of the plunger. The tubular second member has an outer surface with a second guide feature configured for translation along the guide member and has a free end facing the distal end of the plunger and a second activation end configured to abut the first engagement end of the tubular first member. A first spring member is disposed within the tubular first and second members to bias the first and second members away from one another. A second spring member is disposed about the plunger between the tubular first member and the proximal end of the plunger. A driven member is disposed about the plunger between the tubular first member and the second spring and extends outwardly through the window. The second spring biases the driven member toward the tubular first member. The plunger translates toward the electrically activatable coil upon a first energization of the coil, thereby axially translating the tubular first and second members in the sleeve with the first and second guide features translating along the guide member, thereby also translating the driven member conjointly in abutment with the first tubular member. Upon the first guide feature extending axially beyond the guide member, the second activation end rotatably drives the cam surface on the first engagement end of the tubular first member and brings the stop surface into releasable locked engagement with the cam lock feature of the tubular sleeve, thereby maintaining the tubular first member and the driven member in an axially extended, activated position when the coil is de-energized. Then, a second energization of the coil causes the tubular first and second members to translate in the sleeve with the second guide feature translating along the guide member. The second activation end rotatably drives the cam surface on the first engagement end of the tubular first member axially and moves the stop surface out of engagement with the cam lock feature and brings the first guide feature into alignment with the guide member, thereby allowing the tubular first member and the driven member to be axially translated back to a retracted, deactivated position when the coil is de-energized.

Further areas of applicability of a vehicle powertrain system actuator will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 5A-5D illustrate progressive stages of actuation of the powertrain actuator of FIGS. 4A-4D during an energized connecting actuation;

FIGS. 5E-5H illustrate progressive stages of actuation of the powertrain actuator of FIGS. 4A-4D during an energized disconnecting actuation;

DETAILED DESCRIPTION OF EXAMPLE EMBODIMENTS

Figure 1:
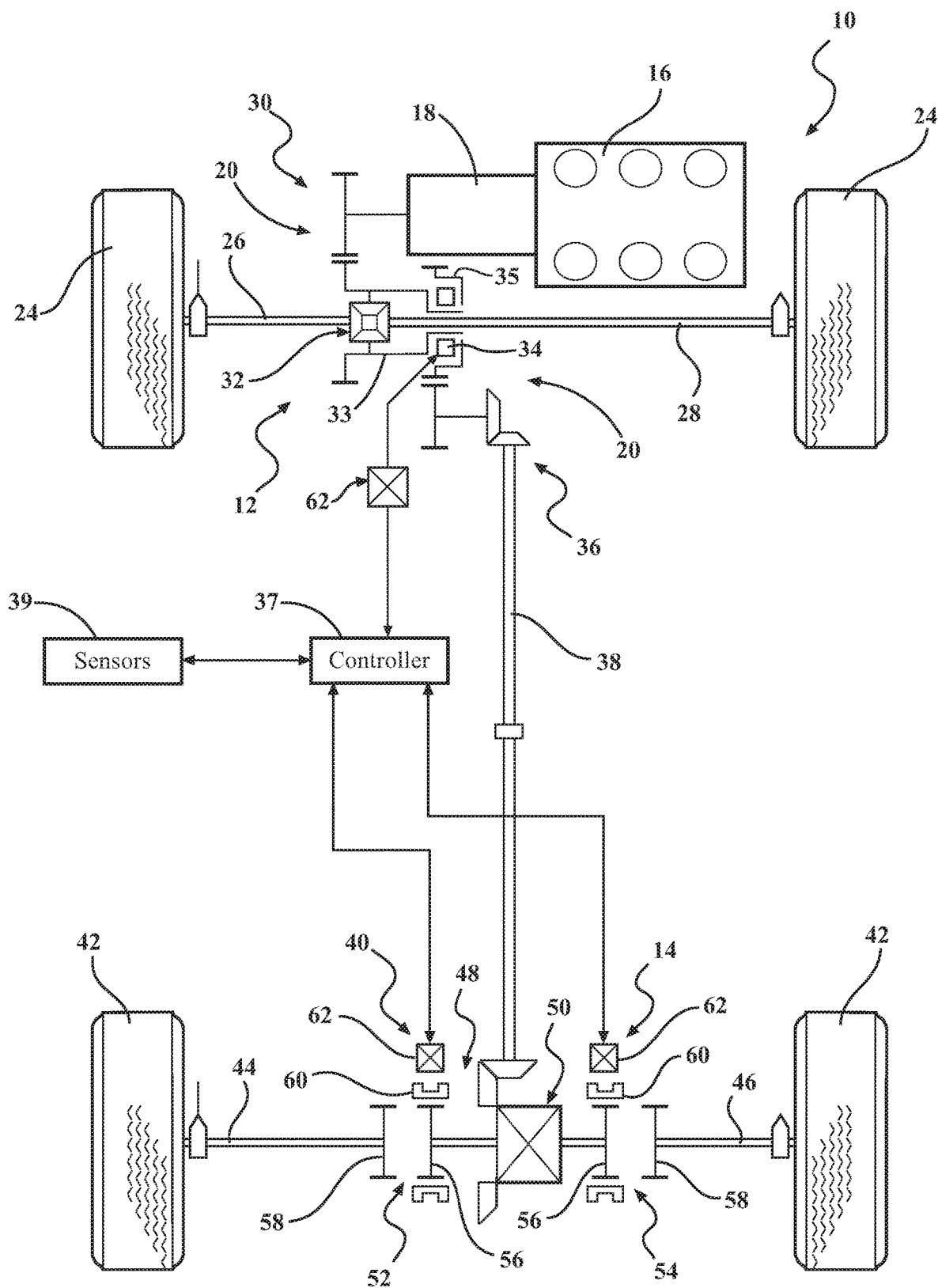
FIG. 1 is a schematic illustration of an exemplary all-wheel drive vehicle equipped with a vehicle powertrain having a power transfer assembly with at least one powertrain actuator of the present disclosure.

The following description is merely exemplary in nature and is not intended to limit the present disclosure, application, or uses. It should be understood that throughout the drawings, corresponding reference numerals indicate like or corresponding parts and features, unless otherwise stated.

In general, example embodiments of vehicle powertrain systems and powertrain actuators therefor, constructed in accordance with the teachings of the present disclosure, will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

In general, the present disclosure relates to a powertrain actuator for use with a torque transfer device (i.e. clutch, disconnect, etc.) installed in a power transfer assembly associated with a powertrain system of a motor vehicle. The powertrain actuator is actuatable to selectively couple a first rotating member with a second rotating member to allow torque to be transmitted therebetween, and is further actuatable to be selectively decoupled to prevent torque from being transmitted therebetween. Upon coupling or decoupling the first and second rotating members, the powertrain actuator remains in a de-energized state, and thus, does not require or otherwise consume energy from the vehicle. Accordingly, the vehicle operating efficiencies and performance are enhanced, and the wear on the powertrain actuator is minimized, thereby maximizing the useful life of the powertrain actuator.

With particular reference to FIG. 1, a powertrain system, referred to as powertrain 10, is shown for all-wheel drive vehicle and generally includes a front driveline 12, a rear driveline 14, an engine 16, a transmission 18, and a power transfer assembly 20. Transmission 18 is a transaxle having an output gearset 30 driving the input to a front differential assembly 32. Front axleshafts 26, 28 are driven by the outputs of front differential assembly 32 for transferring power (i.e. drive torque) to a pair of front wheels 24. Power transfer assembly 20 is configured as a power take-off unit, or PTU, having an input component 33 driven by gearset 30, an output component 35, and a torque transfer device 34 operable for selectively coupling and uncoupling input component 33 and output component 35. Torque transfer device 34 can be either of an active multi-plate friction clutch or a two-position dog clutch, both of which can be actuated via a powertrain actuator 62 that is controlled by a controller 37 in response to input signals from vehicle sensors 39. Output component 35 of PTU 20 drives a right-angled drive assembly, such as a hypoid gearset 36, for transferring drive torque to a rear axle assembly 40 associated with rear driveline 14 via a propshaft 38. Rear axle assembly 40 includes a rear hypoid gearset 48 driving a rear differential assembly 50, a pair of rear wheels 42 driven by first and second rear axleshafts 44, 46, a first torque transfer or disconnect device 52, and a second torque transfer or disconnect device 54.

With continued reference to FIG. 1, first and second disconnect devices 52, 54 selectively drivingly connect/disconnect first and second rear axle shafts 44, 46 from rear hypoid gearset 48 and rear differential assembly 50. First and second disconnect devices 52, 54 may be configured as dog clutches, by way of example and without limitation, having a first rotatable member, also referred to as first clutch gear 56, that is configured for selective operable connection to a second rotatable member, also referred to as second clutch gear 58, via a clutch sleeve 60. Clutch sleeve 60 is selectively translatable into a connected configuration via a vehicle powertrain actuator 62, constructed in accordance with the disclosure, to bring gears 56, 58 into connected, coupled connection with one another such that the gears 56, 58 co-rotate in conjoint fashion with one another to define a coupled operating state. Clutch sleeve 60 is also selectively translated into a disconnected, decoupled configuration to allow gears 56, 58 to rotate relative to one another to define an uncoupled operating state, such that second gear 58 may rotate while first gear 56 remains stationary.

Figure 1A:
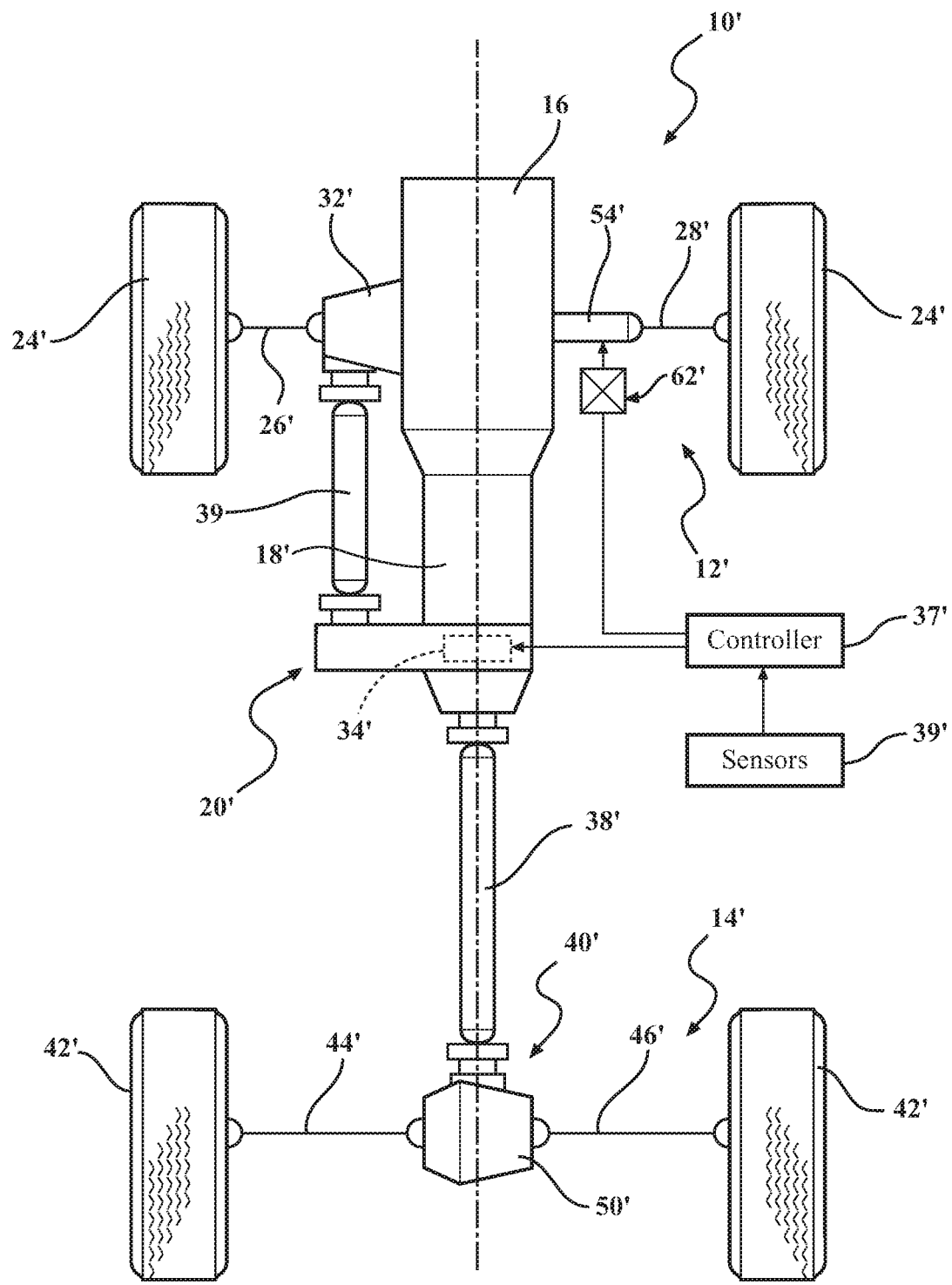
FIG. 1A is a schematic illustration of an exemplary four-wheel drive vehicle equipped with another vehicle powertrain having a power transfer assembly with at least one powertrain actuator of the present disclosure.

FIG. 1A illustrates an alternative powertrain system, referred to as powertrain 10', for a four-wheel drive vehicle and general includes a front driveline 12', a rear driveline 14', an engine 16', a transmission 18', and a power transfer assembly 20'. Power transfer assembly 20' is configured as a transfer case. Drive torque generated by engine 16' and transmission 18' is normally transferred to rear axle assembly 40' of rear driveline 14' via a rear propshaft 38' for driving rear wheels 42' via rear axle shafts 44', 46' and rear differential assembly 50'. A torque transfer device or clutch 34' is located within transfer case 20' and is controlled by controller 37' to selectively transfer drive torque through a front propshaft 39 to a front differential assembly 32'. A disconnect device 54' is provided between front axleshaft 28' and front differential assembly 32' to permit selective connection/disconnection of front driveline 12'. Vehicle powertrain actuator 62', constructed in accordance with the present disclosure is operable for moving a clutch sleeve associated with disconnect device 54'.

Figure 2:
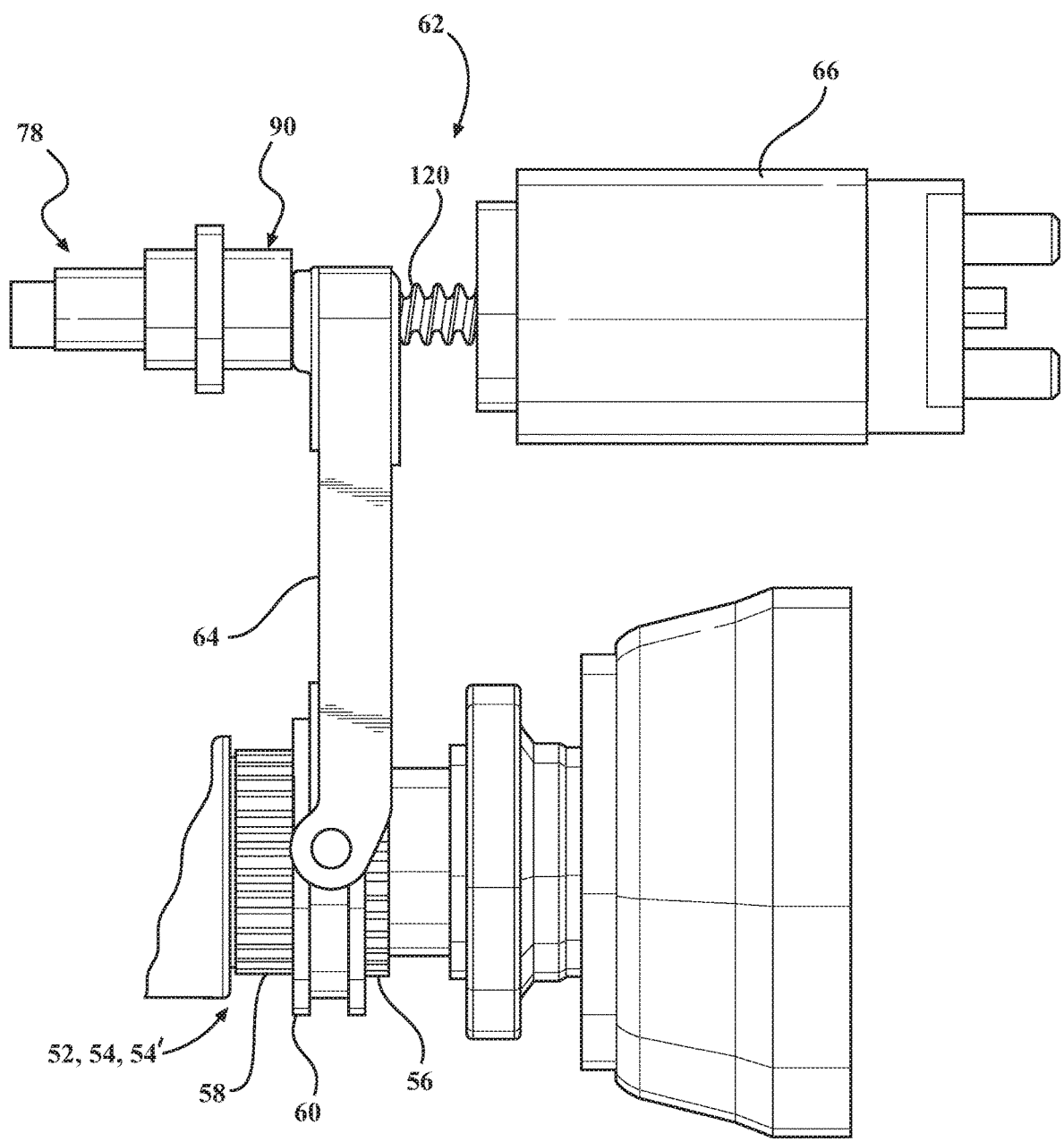
FIG. 2 is a plan view of a powertrain actuator constructed in accordance with one aspect of the disclosure and shown coupled with a sleeve of a torque transfer device in accordance with another aspect of the disclosure.

Each of the above-noted vehicle powertrain actuators, referred to hereafter simply as actuator 62, as best shown in FIG. 2, is operable to translate a driven member 64, shown as a shift fork, by way of example and without limitation, to selectively move sleeve 60 for establishing the coupled and uncoupled states. In this non-limiting example, sleeve 60 is shown for selectively bringing gears 56, 58 of disconnect devices 52, 54, 54' into and out of coupled rotation with one another. Actuator 62 includes a uni-directional axial solenoid 66 that provides bi-stable functionality without continuous electrical draw. Accordingly, upon selectively energizing and de-energizing the solenoid 66 of the actuator 62 a first time, the fork 64 can be translated to a first axial position (FIG. 3A), which can coincide with a disconnected position of sleeve 60, and upon energizing and de-energizing the solenoid 66 of the actuator 62 a subsequent second time, the fork 64 can be translated to a second axial position (FIG. 3B), which can coincide with a connected position of sleeve 60. Between selective electrical actuations of the solenoid 66, the solenoid 66 remains de-energized, while the driven member 64 (fork) and sleeve 60 remain selectively located in their respective positions until the solenoid 66 is again selectively energized.

Figure 3A:
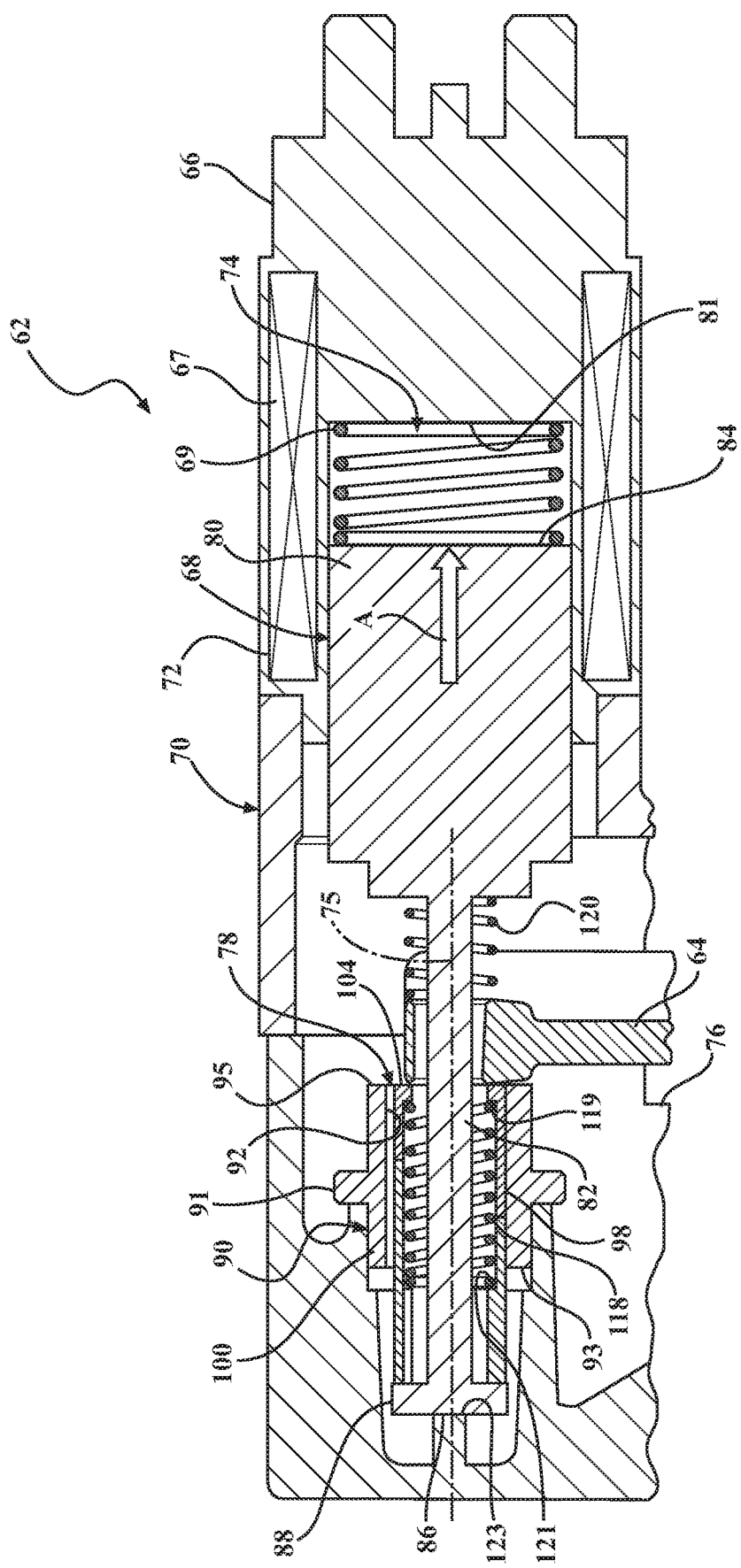
FIG. 3A is a sectional view of the powertrain actuator of FIG. 2 operating in a disconnected, de-energized state.

It will be readily recognized by one skilled in the art that the solenoid 66 is configured for operable connection to a source of electrical power within the vehicle, such as a vehicle battery, generator, or alternate source of power (not shown), wherein an electrical winding, also referred to as coil 67, can be selectively energized to cause translation of a magnetically actuatable plunger 68 (ferrous or otherwise) in a single axial direction, represented by arrow A (FIG. 3A). Upon subsequent de-energizing the coil 67, the plunger 68 is automatically biased without electrical energy to translate in an opposite axial direction to an at-rest, home position, such as under the bias of one or more spring members, such as a spring member 69 disposed in abutment with the plunger 68, at least in part. Accordingly, the plunger 68 translates in a first direction under the bias of a magnetic attraction imparted by the selectively energized coil 67, and translates in a second direction, opposite the first direction, under the bias of one or more spring members 69 upon de-energization of the coil 67. The solenoid 66 can be operated with pulse width modulation (PWM). When the engage/disengage, uni-directionally actuated/energized solenoid 66 is driven with a pulse width modulated voltage, the engagement can be tailored or optimized to produce the best engagement for general shift and blocked shift conditions. For instance, fast actuation when required, or a smooth engagement and release for when slower response is acceptable to minimize noise and vibration.

Figure 3B:
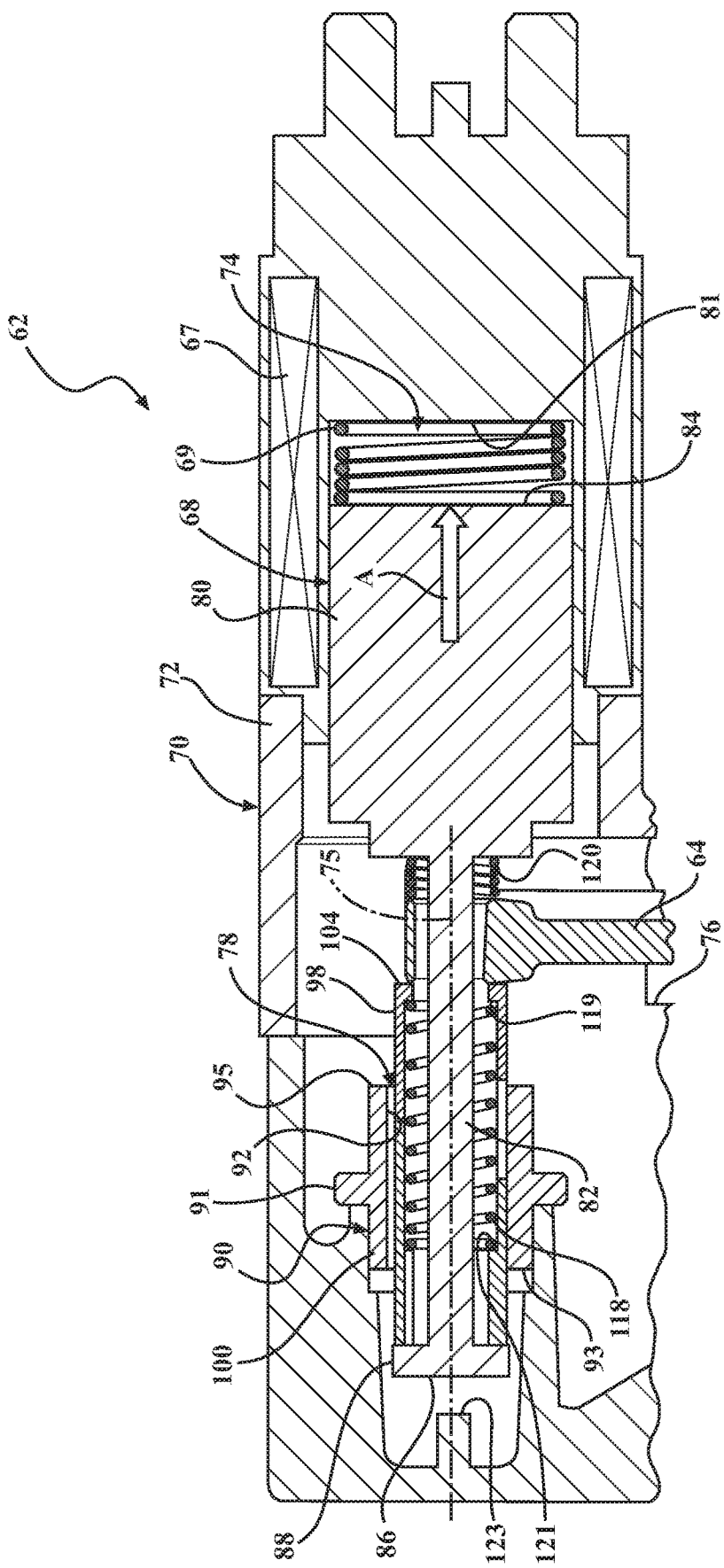
FIG. 3B is a sectional view of the powertrain actuator of FIG. 3A operating in an energized state.

In accordance with a non-limiting embodiment shown in FIGS. 3A-3B, the actuator 62 has a housing 70, shown as being provided in part by the solenoid 66 or fixed to the solenoid 66, having a wall 72 that bounds a cavity 74. The cavity 74 is sized for receipt of the plunger 68 for axial translation therein and for receipt of a cam assembly 78 that is operable to maintain the fork 64 in bi-stable states, with a first state corresponding to the sleeve 60 being positioned in a disconnected position and a second state corresponding to the sleeve 60 being positioned in a connected position. To accommodate the fork 64, the wall 72 has a through opening, also referred to as window 76, through which the fork 64 extends and translates, with the fork 64 having an end couple in slidable relation about the plunger 68, during energization and de-energization of the solenoid 66.

The plunger 68 is disposed in the cavity 74 for axial translation therein. The plunger 68 is shown, by way of example and without limitation, as having an enlarged diameter portion 80 sized for close, guided sliding receipt in along the wall 72 of the cavity 74 and a reduced diameter, elongate rod portion 82 extending between a proximal end 84, against which the spring member 69 abuts, in addition to an end wall 81 of the cavity 74, adjacent the coil 67, and an opposite distal end 86, shown having a radially enlarged portion, shown as an annular flange 88, wherein flange 88 is sized for abutment with an end of the cam assembly 78 to retain cam assembly 78 on elongate portion 82. The proximal end 84 is configured for magnetic communication with the electrically activatable coil 67 to cause the plunger 68 to translate axially in the cavity 74 upon coil 67 being energized.

A tubular sleeve 90 is fixedly disposed in the cavity 74 to house and guide the cam assembly 78 for axial translation therein, wherein sleeve 90 can be fixed via captured engagement of a radially outwardly extending shoulder or flange 91 or a recessed notch 91', by way of example and without limitation. The tubular sleeve 90 has a throughbore 92 extending between open opposite ends 93, 95. The throughbore 92 has at least one, and shown as a plurality of guide members 94, shown as a recessed channel extending radially outwardly into the inner surface bounding the throughbore 92, by way of example and without limitation. The guide members 94 are shown as extending axially between the open opposite ends 93, 95. The sleeve 90 further includes at least one, and shown as a plurality of cam lock features 96. The cam lock features 96 are shown as recessed, circumferentially inclined cam ramps extending directly from and in oblique relation from the recessed channels 94. Accordingly, each cam lock feature 96 extends in circumferentially spaced relation from, and in radially adjacent relation to, a respective one of the guide members 94. It should be recognized that as many cam lock features 96 can be provided there are number of guide members 94.

The cam assembly 78 includes, as best shown in FIGS. 4A-4D, 5A-5H and 6A-6B, a tubular first member 98 and a tubular second member 100. The first and second members 98, 100 are disposed at least in part in the tubular sleeve 90 and about the elongate portion 82 of the plunger 68. The tubular first member 98 has a cylindrical outer surface 99 with at least one, and shown as a plurality of first guide features 102, shown as a plurality of elongate ribs extending radially outwardly from the outer surface 99, by way of example and without limitation, with the first guide features 102 being configured for translation along the guide members 94. The outer surface 99 of the tubular first member 98 extends between a free end 104 facing the proximal end 84 of the plunger 68 and a first engagement end 106 facing the distal end 86 of the plunger 68. The first engagement end 106 has at least one, and shown as a plurality of inclined cam surfaces 108. The cam surfaces 108 are generally shown having a zig-zag, undulating contour with adjacent inclined cam surfaces 108 converging toward one another to form alternating peaks (P) and valleys (V).

The tubular second member 100 is disposed in the tubular sleeve 90 and about the elongate portion 82 of the plunger 68 between the tubular first member 98 and the distal end 86 of the plunger 68. The tubular second member 100 has a cylindrical outer surface with at least one, and shown as a plurality of second guide features 110, shown as a plurality of ribs extending radially outwardly from the outer surface, by way of example and without limitation, with the second guide features 110 being configured for translation along respective ones of the guide members 94. The tubular second member 100 has a free end 112 facing the distal end 86 of the plunger 68 and a second activation end 114 having a plurality of inclined drive surfaces 116 configured to abut and drive the cam surfaces 108 on the first engagement end 106 of the tubular first member 98 during energization of the solenoid 66. The drive surfaces 116 are generally shown having a similarly zig-zag, undulating contour as the cam surfaces 108, with adjacent inclined drive surfaces 116 converging toward one another to form alternating peaks (P') and valleys (V').

As best shown in FIGS. 3A and 3B, a first spring member 118 is disposed within the tubular first and second members 98, 100 and about the elongate portion 82 of the plunger 68. The first spring member 118 has opposite ends, with one end configured to confront a protrusion or first shoulder 119 within the first tubular member 98 and with another end configured to confront a protrusion or second shoulder 121 within the second tubular member 100, such that the first spring member 118 is axially compressed and loaded between the first and second shoulders 119, 121. Accordingly, first spring member 118 tends to bias the first and second members 98, 100 away from one another. A second spring member 120 is disposed about the elongate portion 82 of the plunger 68 between the tubular first member 98 and the proximal end 84 of the plunger 68, and is shown as being disposed between and in abutment with the fork 64 and an end of the enlarged diameter portion 80 of the plunger 68. The second spring member 120 is sized such that it is constantly compressed axially to impart a bias on the fork 64, thereby biasing the fork 64 toward and into abutment with an end of the tubular first member 98.

In use, when the sleeve 60 is in a disconnected state, and when operation of the vehicle in the four-wheel drive mode is desired, a first energization of the coil 67 is selectively performed, thereby causing the plunger 68 and tubular first and second members 98, 100 to translate in the tubular sleeve 90 from the resting disconnected state (FIG. 5A) along the direction of arrow A with the first and second guide features 102, 110 translating along the guide member 94 of the sleeve 90. During the initial axial movement of the first and second members 98, 100, their respective first and second guide features 102, 110 remain in close sliding receipt in the guide member recess channel 94, and thus, although the drive surfaces 116 of the tubular second member 100 impart a torque on the mating cam surfaces 108 of the tubular first member 98, the tubular first and second members 98, 100 are prevented from relative rotation as a result of the guide features 102, 110 being confronted and blocked from rotation by guiding side walls of the guide member recess channel 94 (FIG. 5B). As the first and second members 98, 100 translate, the sleeve 90 remains fixed and the fork 64, being in abutment with the free end 104 of the tubular first member 98, is caused to translate conjointly with the first and second members 98, 100 along the direction of arrow A over an axial displacement distance "X" (FIG. 3B) sufficient to bring the sleeve 60 into a connected state, thereby operably coupling the first and second rotatable members 56, 58 to one another for co-rotation with one another.

Figure 5C:
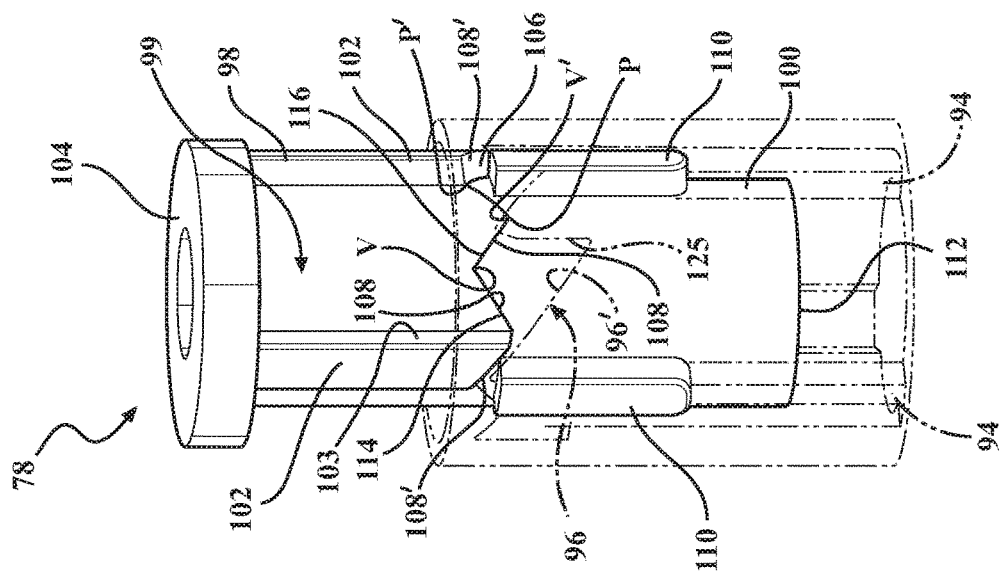
Figure 5B:
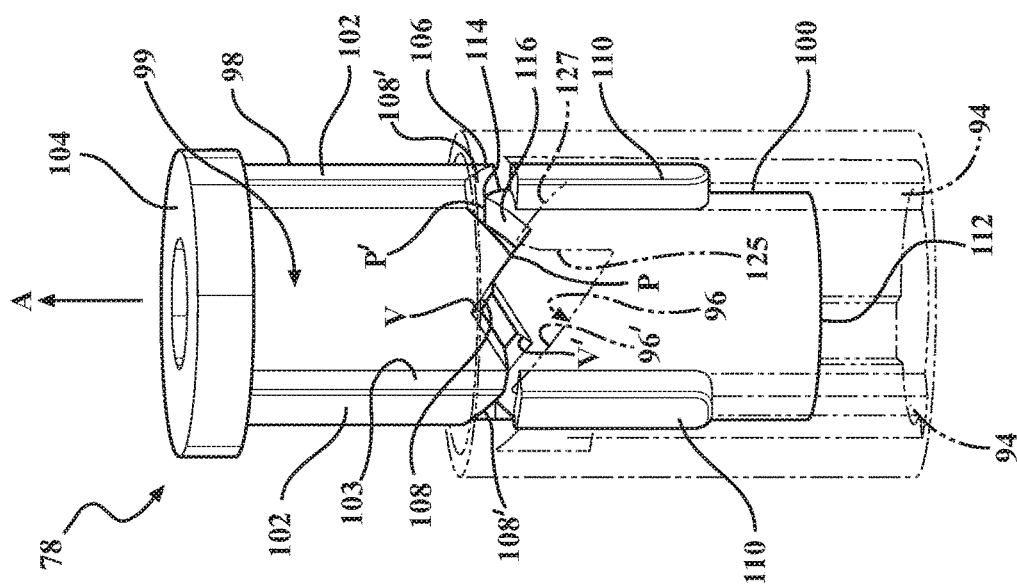
Figure 5A:
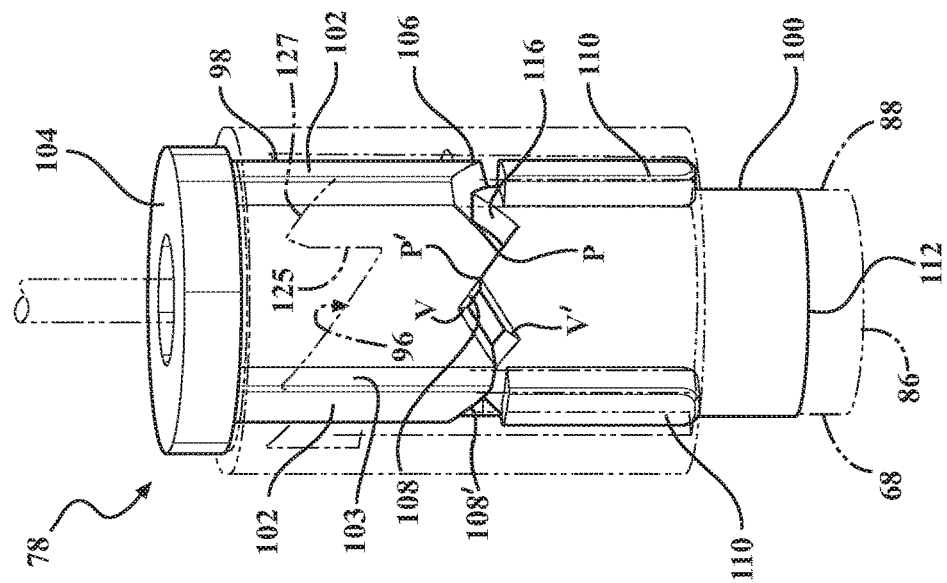

Upon being fully energized and fully actuated, the first guide features 102 are translated axially to extend beyond and axially outwardly from the recessed guide member 94, and thus, the torsion applied by the drive surfaces 116 on the second activation end 114 of the tubular second member 100 on the mating cam surfaces 108 of the tubular first member 98 acts to rotatably drive sliding surfaces 108' on ends of the first guide features 102 of the tubular first member 98 into axially aligned engagement with helically inclined surfaces 96' of cam lock features 96 (FIG. 5C), thereby causing the sliding surfaces 108' to slide down the helically inclined surfaces 96' of cam lock feature 96 to bring a stop surface 103 of the guide features 102 into seated abutment against an axially extending lock surface 125 of the cam lock features 96 (FIG. 5D). As such, the tubular first member 98 and the fork 64 are maintained in an axially translated, extended activated position, even upon the coil being subsequently de-energized (FIG. 3B). While the fork 64 is in the coupled state, and while the coil remains de-energized, the first, second and third spring members 118, 120, 69, respectively, act in combination with one another to maintain a compression bias on the components to prevent axial play therebetween, as will be understood by one skilled in the art. In particular, the third spring member 69 acts on the proximal end 84 of the plunger 68 to bias the plunger 68 in a direction opposite arrow A into seated abutment with a stop surface 123 of the housing 70; the second spring member 120 remains axially compressed between the fork 64 and enlarged diameter portion 80 of the plunger 68, and the first spring member 118 remains axially compressed between the first and second shoulders 119, 121 of the tubular first and second members 98, 100 to maintain the second tubular member 100 in abutment with the flange 88 of the plunger 68 and the first tubular member 98 in abutment with the fork 64.

Figures 5F, 5G, 5H:
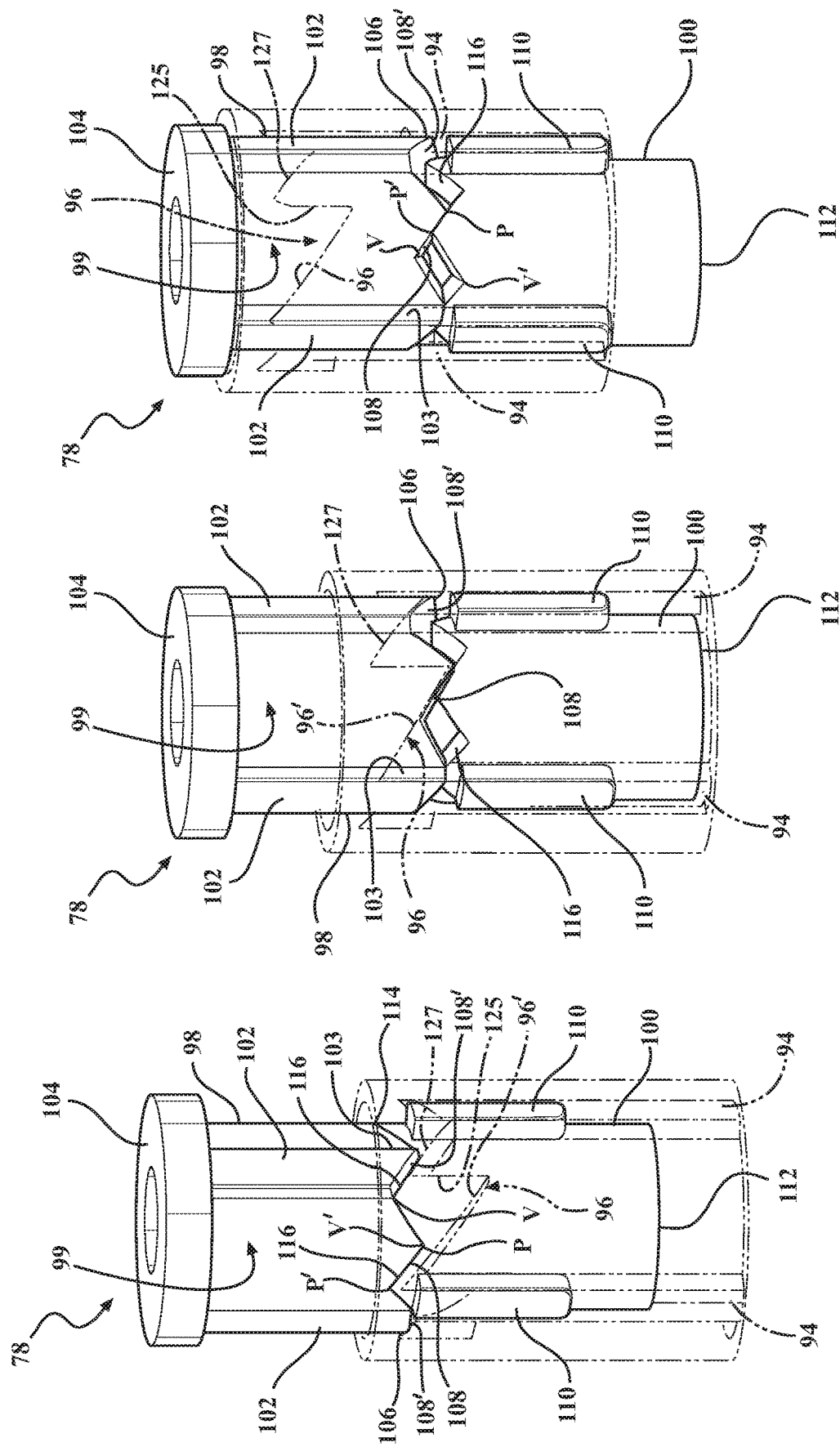
Figure 6A:
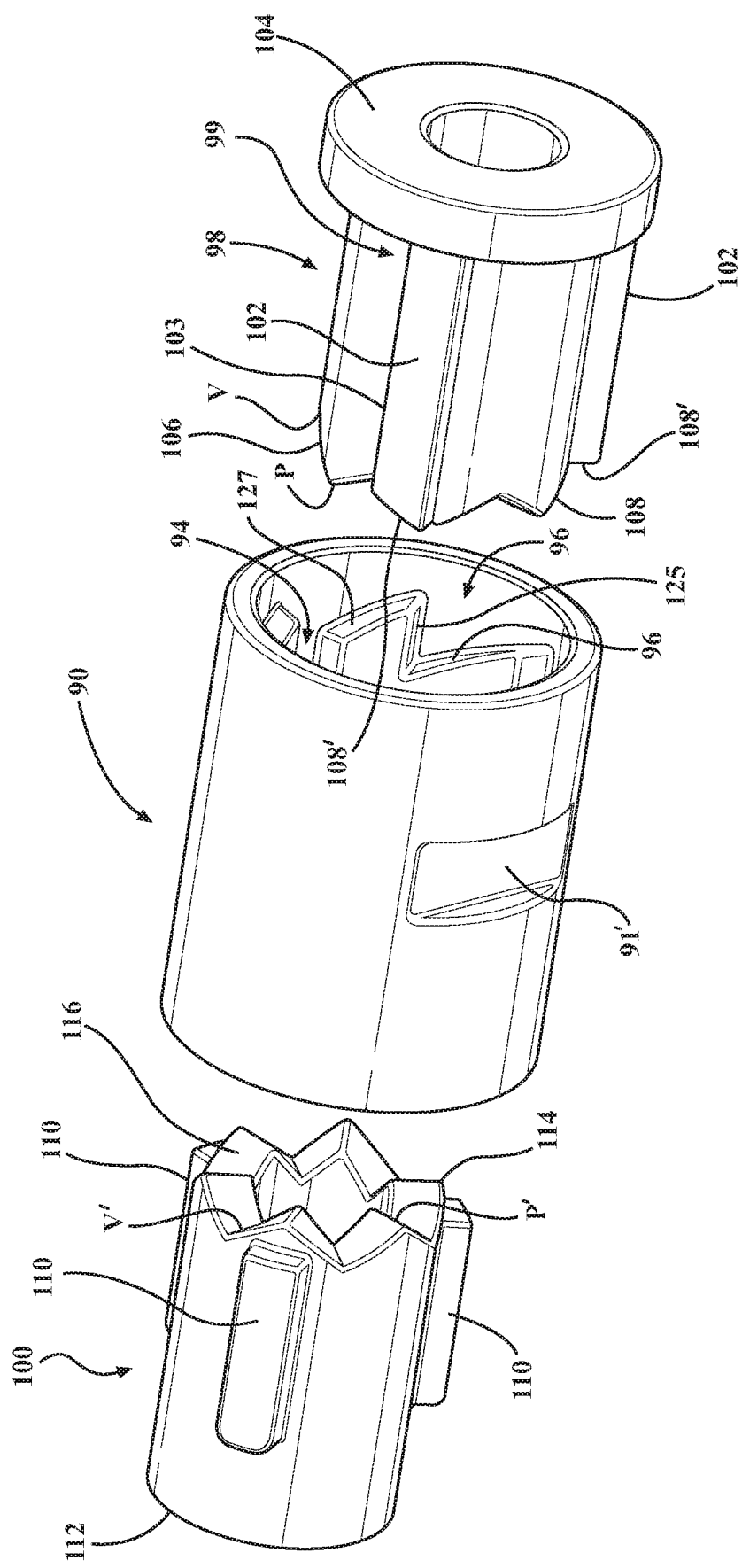
FIG. 6A is an exploded view of a cam assembly associated with the powertrain actuator of FIGS. 5A-5H.
Figure 6B:
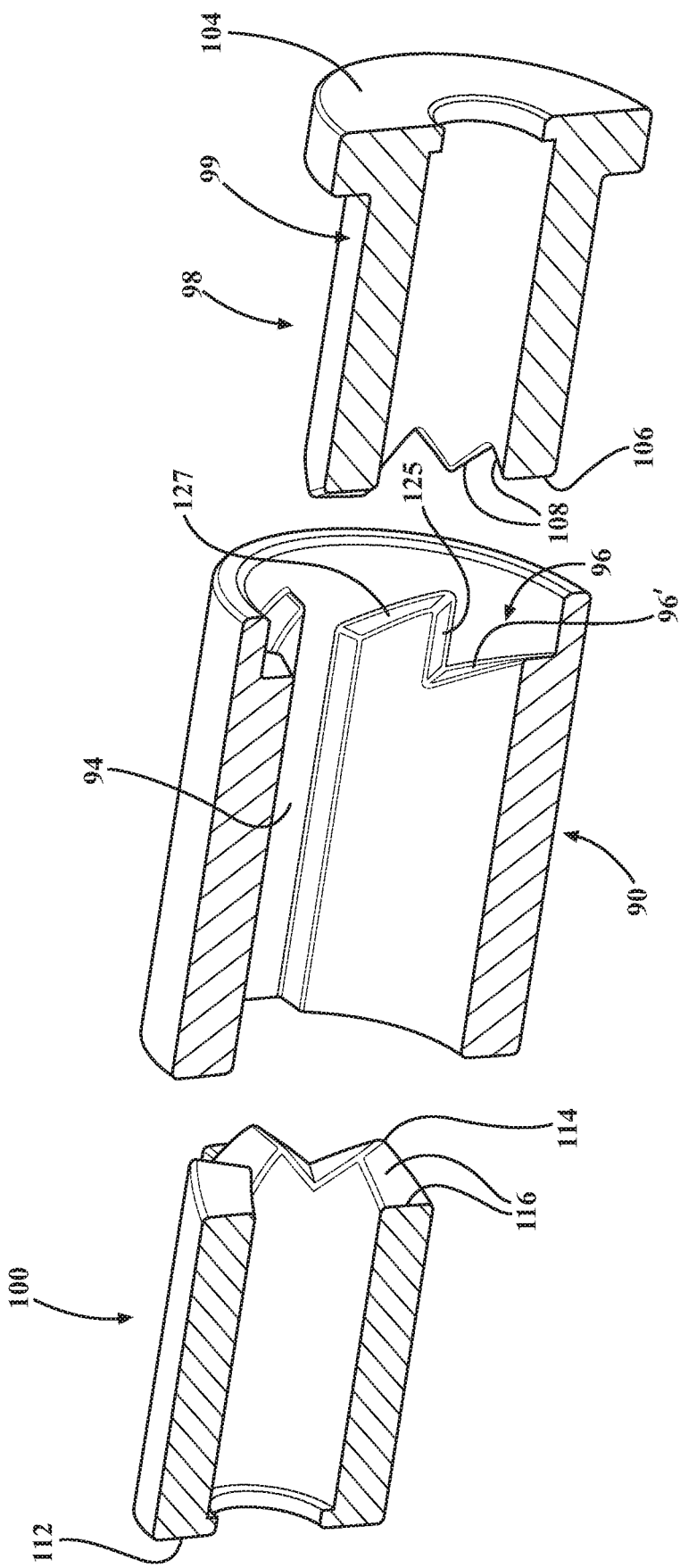
FIG. 6B is a cross-sectional view taken generally along a central longitudinal axis of the cam assembly of FIG. 6A.

When it is then desired to disconnect the first and second rotatable members 56, 58 from one another and shift the vehicle from the four-wheel drive mode into a two-wheel drive mode, a second energization of the coil 67 can be selectively performed to cause the tubular second member 100 to translate within the sleeve 90 with the stop surface 103 of the first guide feature 102 translating along the lock surface 125 of the guide member 94, whereupon the drive surfaces 116 of the second activation end 114 engage the cam surfaces 108 of the first engagement end 106 to drive the tubular first member 98 axially along the direction of arrow A (FIG. 5E) until the first guide features 102 are translated axially beyond the lock surfaces 125 of the cam lock features 96, whereupon the torque between the drive surfaces 116 and the cam surfaces 108 causes the tubular first member 98 to index rotatably in the direction of arrow R (FIG. 4B) until the peaks P' of the tubular second member 100 seat into the valleys V of the tubular first member 98 (FIG. 5F). With the peaks P' of the tubular second member 100 seated in the valleys V of the tubular first member 98, the sliding surfaces 108' of the first guide features 102 are brought into axial alignment with inclined guide surfaces 127 that slope toward an entrance of the guide members 94. Then, the coil 67 is de-energized, whereupon the spring member 69 exerts a sufficient spring bias on the plunger 68 to return the plunger 68 into seated abutment with the stop surface 123 of the housing 70. Further yet, the second spring member 120 exerts a sufficient spring bias against the fork 64 and the tubular first member 98 to cause them to translate axially, with the first and second guide features 102, 110 becoming axially aligned with one another and with the guide members 94 of the tubular sleeve 90 (FIG. 5G), whereupon the first spring member 118 exerts a sufficient spring bias on the tubular first member 98, thereby allowing the tubular first member 98 and the fork 64 to be axially translated back to a retracted, deactivated position when the coil 67 is de-energized (FIG. 5H), whereat the powertrain system actuator 62 and fork 64 remain until it is desired to selectively change the operating state thereof via another selective energizing of the coil 67.

In FIGS. 7A-7I and 8A-8B a tubular sleeve 190 and cam assembly 178 constructed in accordance with another aspect of the disclosure is shown, wherein the same reference numerals, offset by a factor of 100, are used to identify like features. The function of the tubular sleeve 190 and cam assembly 178 is the same as discussed above, with the notable structural differences being discussed hereafter. Accordingly, it is to be recognized that the tubular sleeve 190 and cam assembly 178 can be retrofitted with tubular sleeve 90 and cam assembly 78, and vice versa. The tubular sleeve 190 has a throughbore 192 including at least one, and shown as a plurality of guide members 194 (best seen in FIG. 8B), shown as ribs extending radially inwardly from an inner cylindrical surface into the throughbore 92, by way of example and without limitation. The guide members 194 terminate to provide a plurality of cam lock features 196. The cam lock features 196 are shown as having obliquely, helically inclined sliding surfaces formed at a free end of the guide members 194.

The cam assembly 178 includes, as shown in FIGS. 7A-7I and 8A-8B, a tubular first member 198 and a tubular second member 200. The tubular first and second members 198, 200 are disposed at least in part in the tubular sleeve 190 and about the elongate portion 82 of the plunger 68, with the first and second members 198, 200 being biased axially away from one another via spring member bearing against respective first and second shoulders 219, 221 (FIG. 8B) (as discussed above and shown in FIGS. 3A-3C, it is to be recognized that the tubular sleeve 190 and cam assembly 178 can replace the tubular sleeve 90 and cam assembly 78, such that the remaining components of a powertrain system actuator including the tubular sleeve 190 and cam assembly 178 remain the same or similar to those discussed above for actuator 62). The tubular first member 198 has an outer surface with at least one, and shown as a plurality of axially extending first guide features 202, shown as a plurality of axially extending surfaces, by way of example and without limitation, configured for confronting abutment with and translation along the guide members 194. The outer surface of the tubular first member 198 extends between a free end 204 facing the proximal end 84 of the plunger 68 and a first engagement end 206 facing the distal end 86 of the plunger 68. The first engagement end 206 has at least one, and shown as a plurality of helically inclined cam surfaces 208 extending therefrom toward the free end 204. The first guide features 202 and cam surfaces 208 are formed facing one another via common cutouts or notches that extend axially into the first engagement end 206, with the associated first guide feature 202 extending along a straight, axial path relative to a central longitudinal axis along one side of the notch and the associated cam surface 208 extending obliquely to the first guide feature 202 along an opposite side of the notch, as shown. A notched stop surface 203 is provided to extend axially into each of the cam surface 208. The stop surfaces 203 are sized for close siding receipt of the guide members 194 therein during use, as discussed further below.

The tubular second member 200 is disposed in the tubular sleeve 190 and about the elongate portion 82 of the plunger 68 between the tubular first member 198 and the distal end 86 of the plunger 68. The tubular second member 200 has a cylindrical outer surface with at least one, and shown as a plurality of second guide features 210, shown as recessed, axially extending channels extending radially inwardly into the outer cylindrical surface, by way of example and without limitation, configured for translation along respective ones of the guide members 194. The tubular second member 200 has a free end 212 facing the distal end 86 of the plunger 68 and a second activation end 214 having a plurality of helically inclined drive surfaces 216 configured to abut and drive the cam surfaces 208 extending into the first engagement end 206 of the tubular first member 198 during energization of the solenoid 66.

Figure 7C:
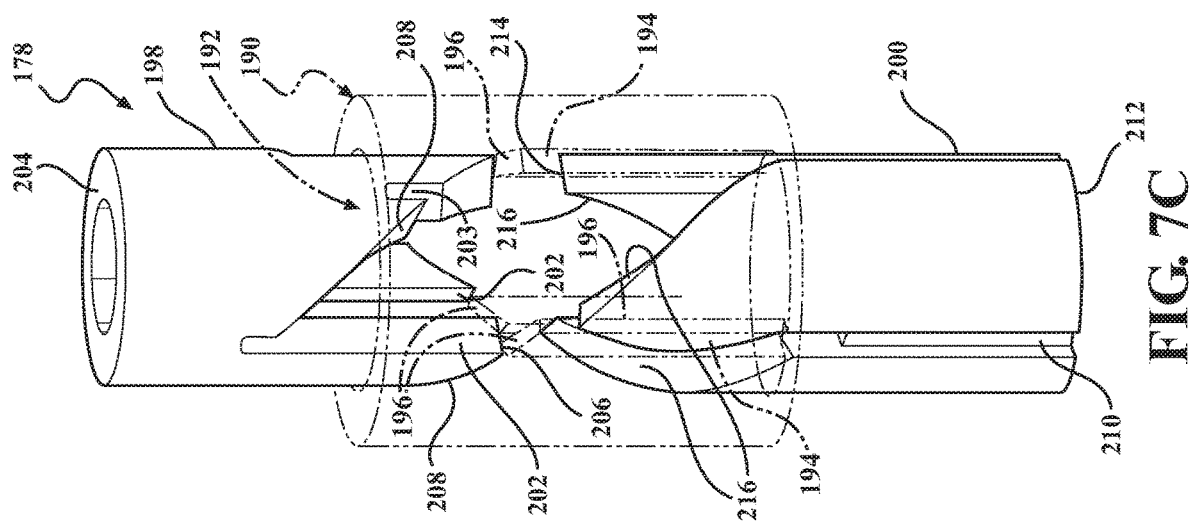
FIG. 7A-7D illustrate progressive stages of actuation of a powertrain actuator in accordance with another aspect of the disclosure during a connecting actuation.
Figure 7B:
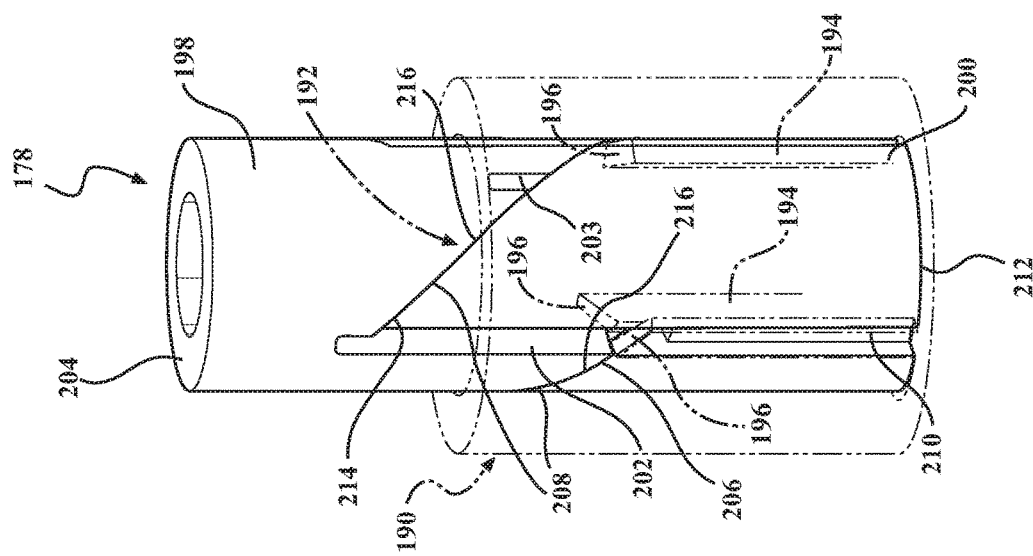
Figure 7A:
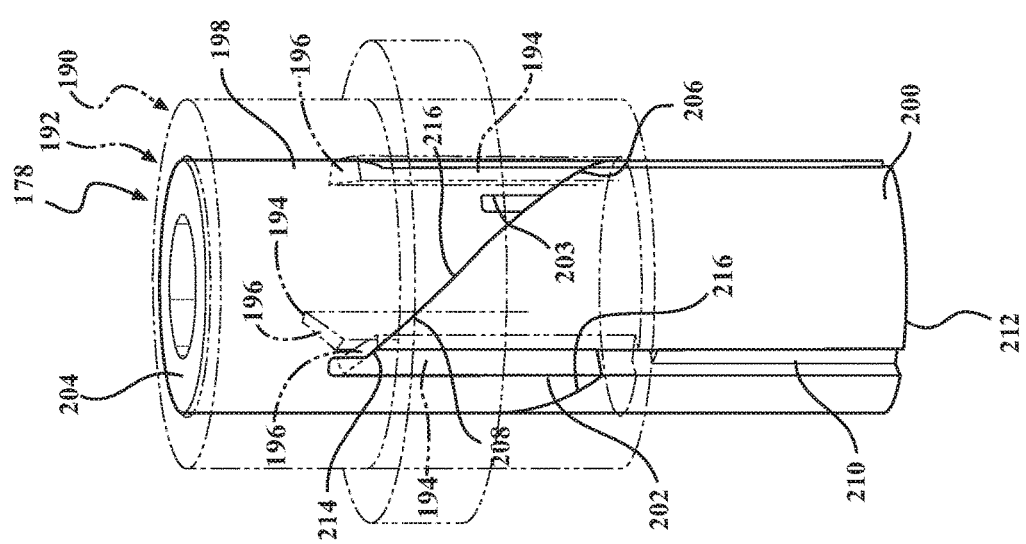
Figure 7F:
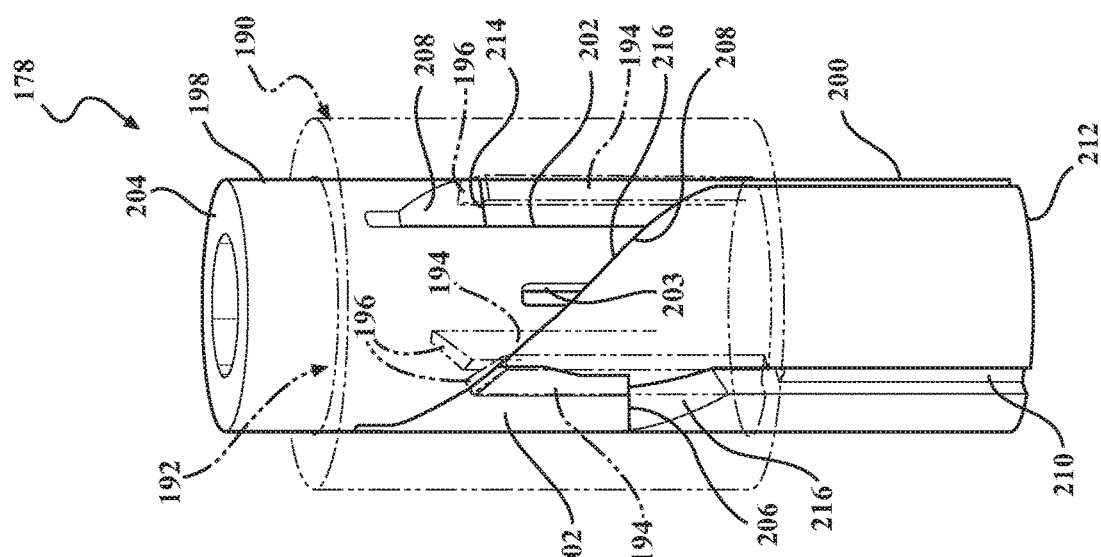
FIGS. 7E-7I illustrate progressive stages of actuation of the powertrain actuator of FIGS. 7A-7D during a disconnecting actuation.
Figure 7E:
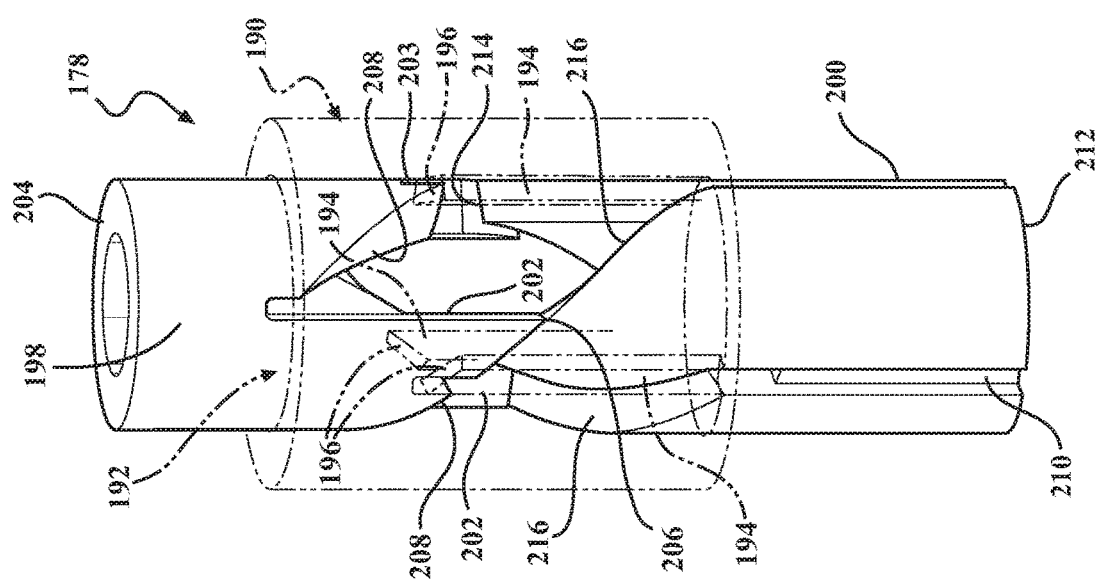
Figure 7D:
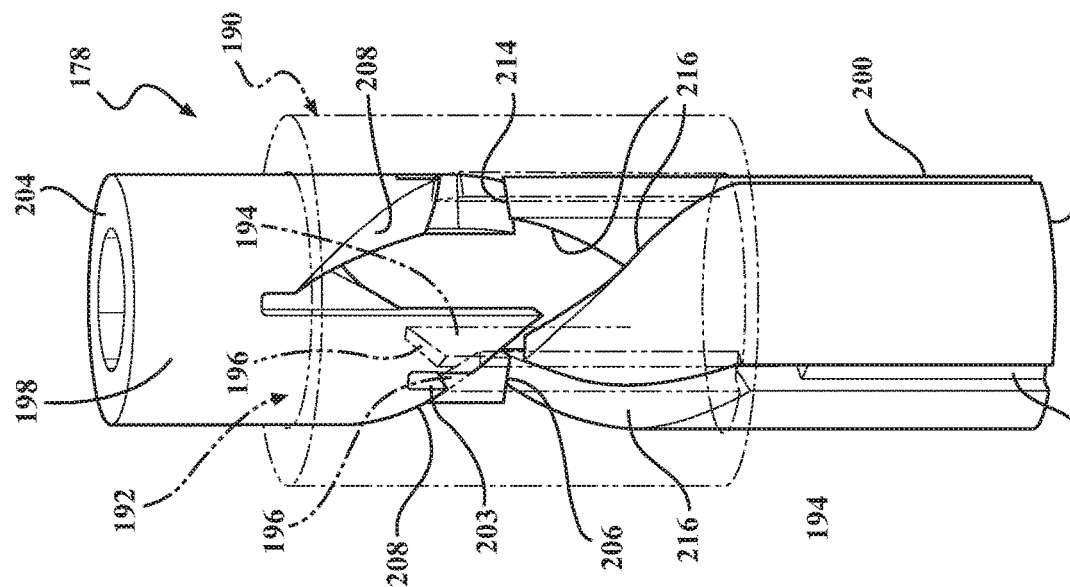
Figure 7I:
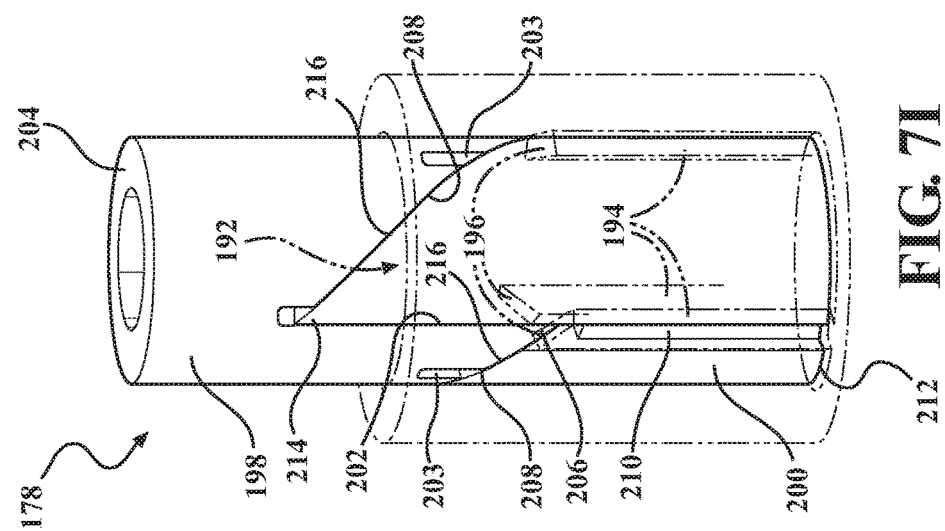
Figure 7H:
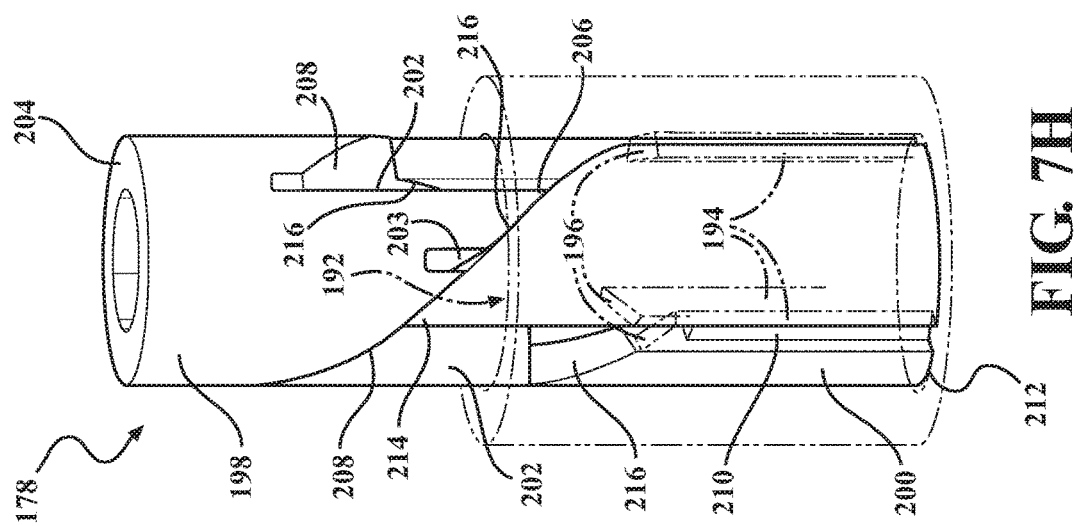
Figure 7G:
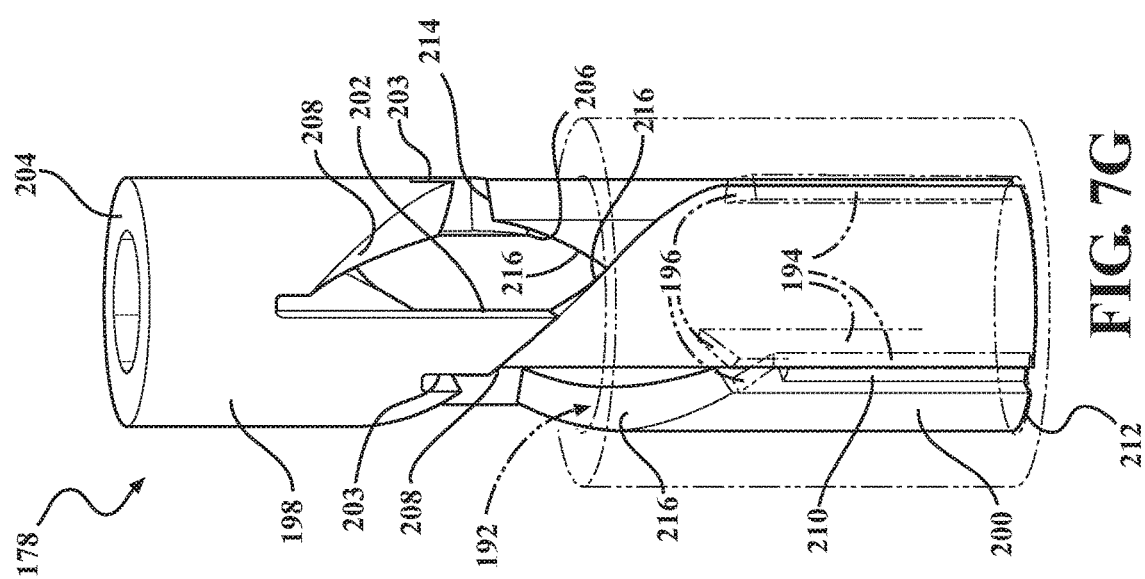
Figure 8A:
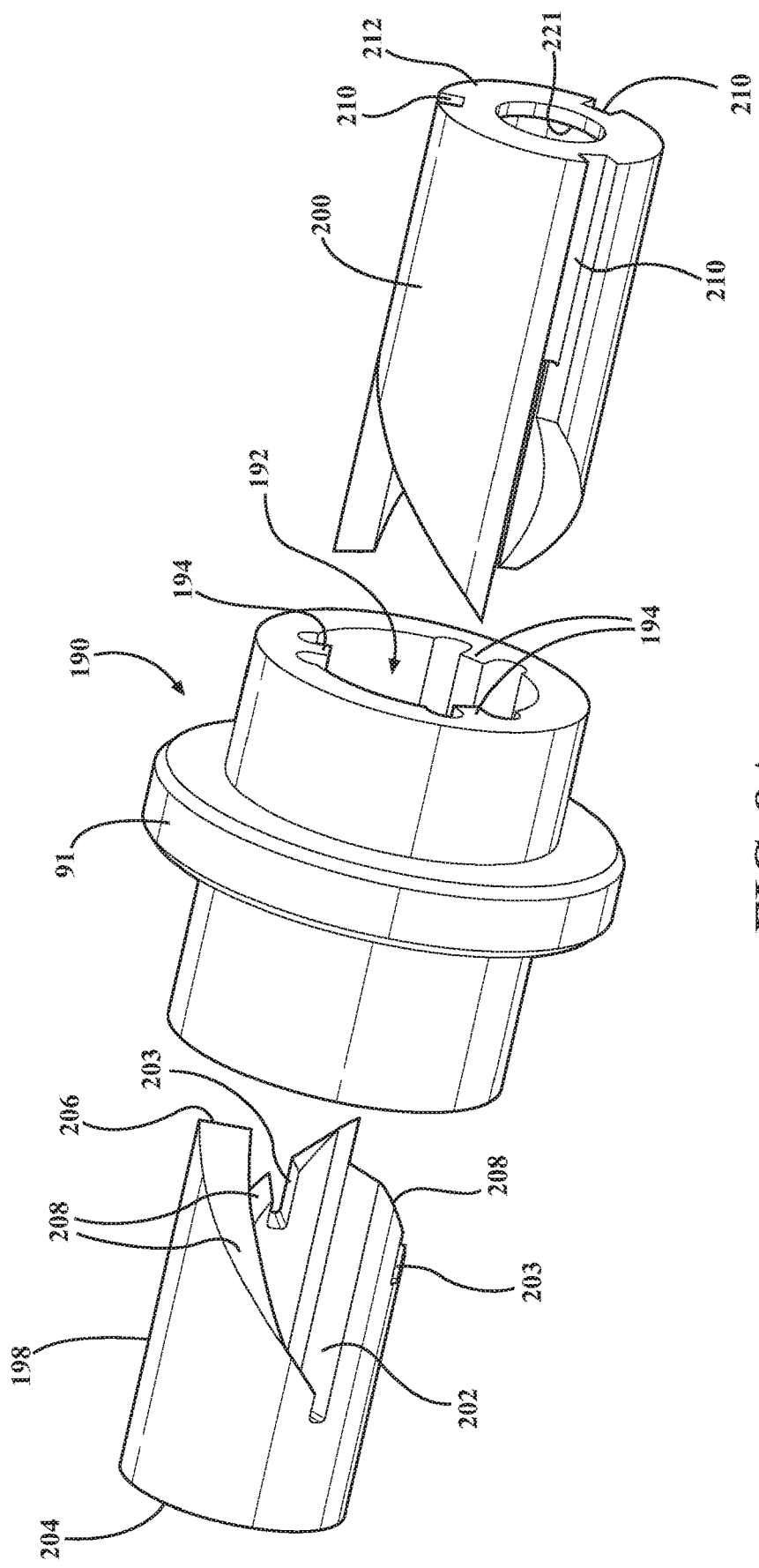
FIG. 8A is an exploded view of a cam assembly of the powertrain actuator of FIGS. 7A-7I.
Figure 8B:
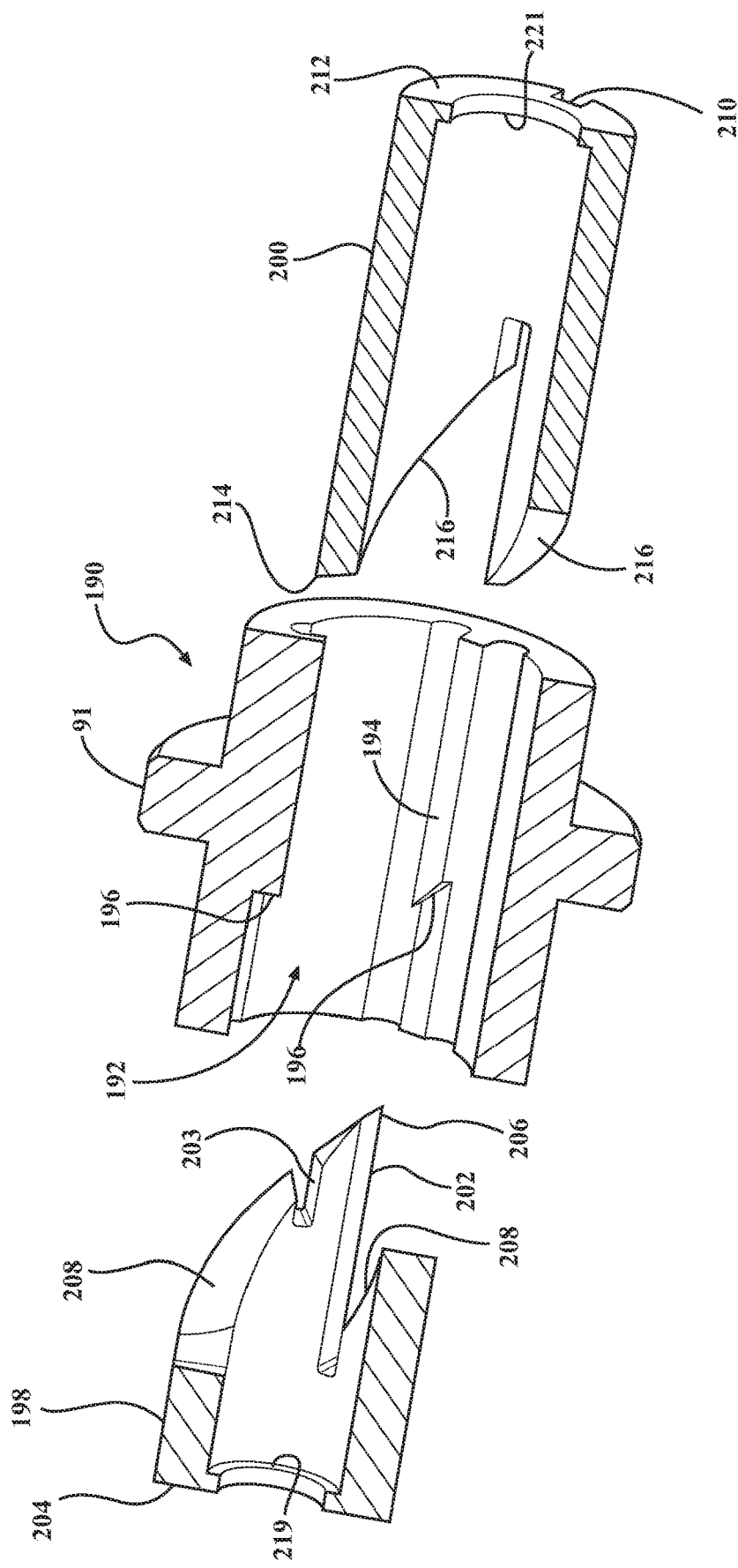
FIG. 8B is a cross-sectional view taken generally along a central longitudinal axis of the cam assembly of FIG. 8A.

In use, when the sleeve 60 is in its disconnected state, and when activation of the four-wheel drive mode is desired, a first energization of the coil 67 is performed, thereby causing the plunger 68 and tubular first and second members 198, 200 to translate in the sleeve 90 along the direction A with the first and second guide features 202, 210, being axially aligned with one another, translating along the guide member 194 of the sleeve 190. During the initial axial movement of the first and second members 198, 200, their respective first and second guide features 202, 210 remain axially aligned with one another and in close sliding abutment with the radially inwardly extending, axially straight surface of the guide member 194, and thus, although the drive surfaces 216 impart a torque on the mating cam surfaces 208, the first and second members 198, 200 are prevented from relative rotation as a result the first and second guide features 202, 210 being abutted against and blocked from rotation by the inwardly extending side walls of the guide member 194 (FIG. 7A). As the first and second members 198, 200 translate, the sleeve 190 remains fixed and the fork 64 is caused to translate conjointly with the first and second member 198, 200 along the axis A over an axial displacement distance X (FIG. 3C) sufficient to bring the sleeve 60 into an engaged, connected state, thereby operably coupling the first and second rotatable members 56, 58 to one another.

Figure 3C:
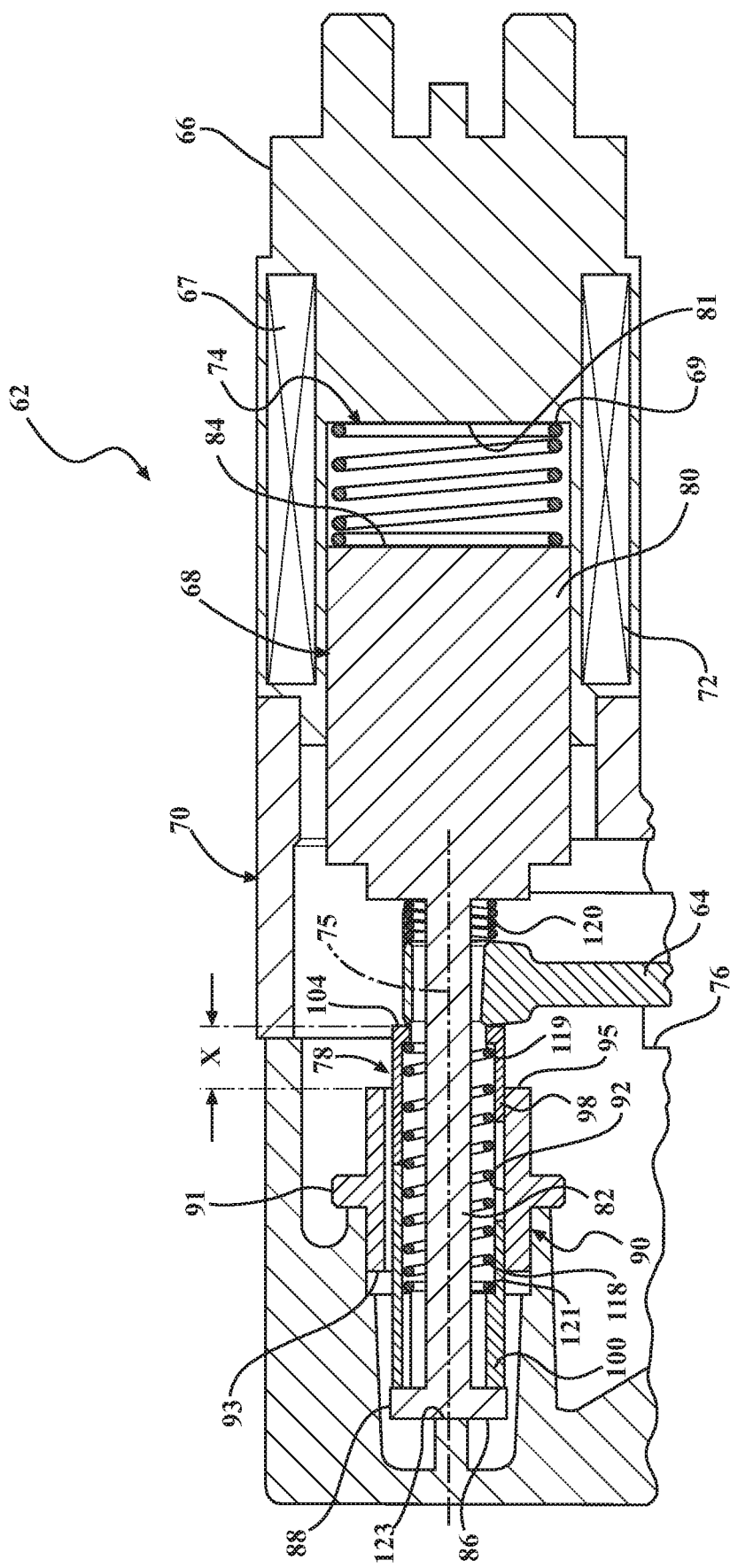
FIG. 3C is a sectional view similar to FIG. 3A showing the powertrain actuator operating in a connected, de-energized state.
Figure 4A:
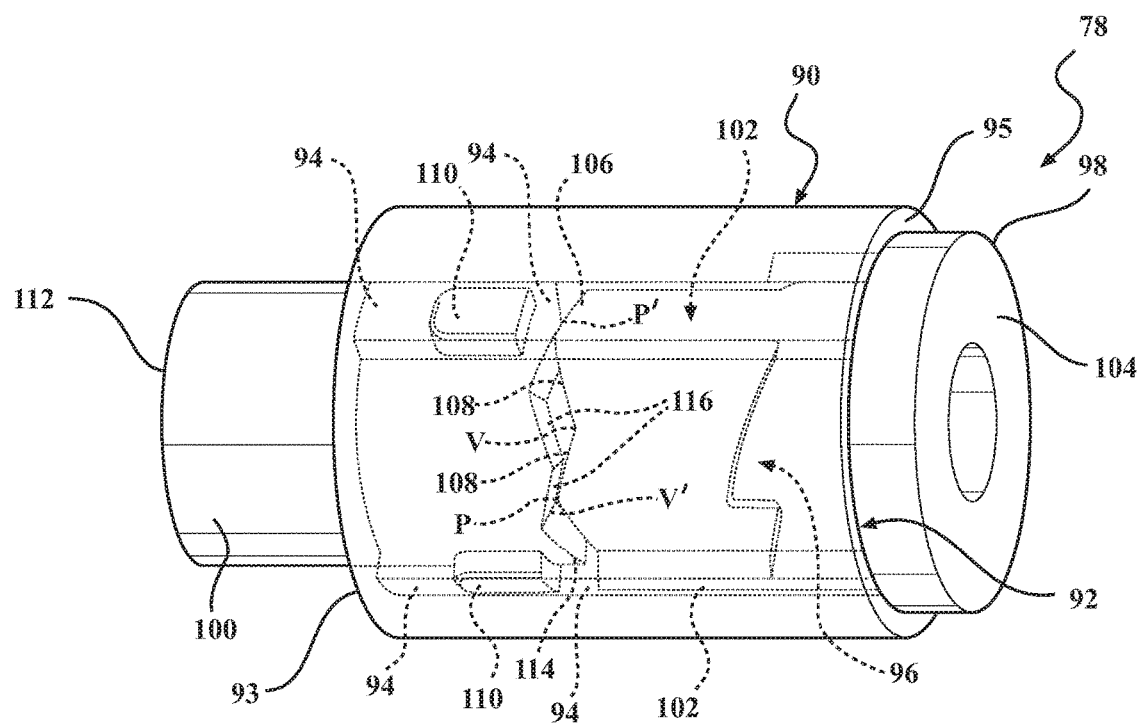
FIG. 4A is a partial schematic, perspective transparent view of a powertrain actuator constructed in accordance with one aspect of the disclosure and operating in a de-energized, disconnected state.
Figure 4B:
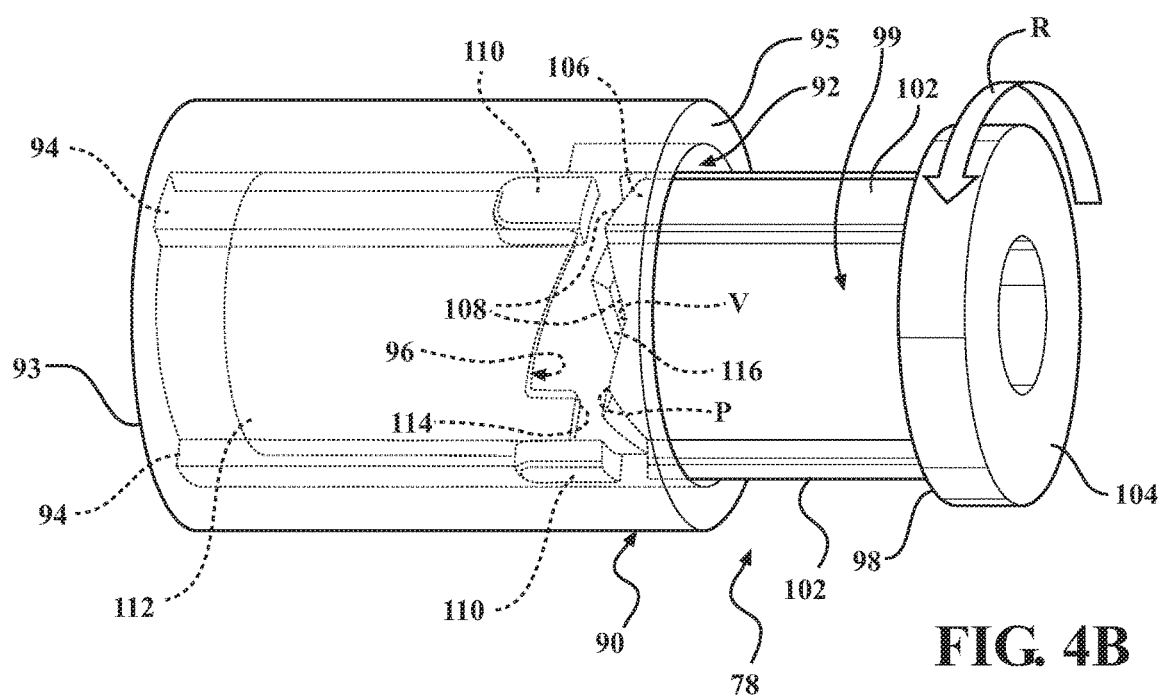
FIG. 4B is a partial schematic, perspective transparent view of the powertrain actuator of FIG. 4A now operating in an energized connecting actuation state.
Figure 4C:
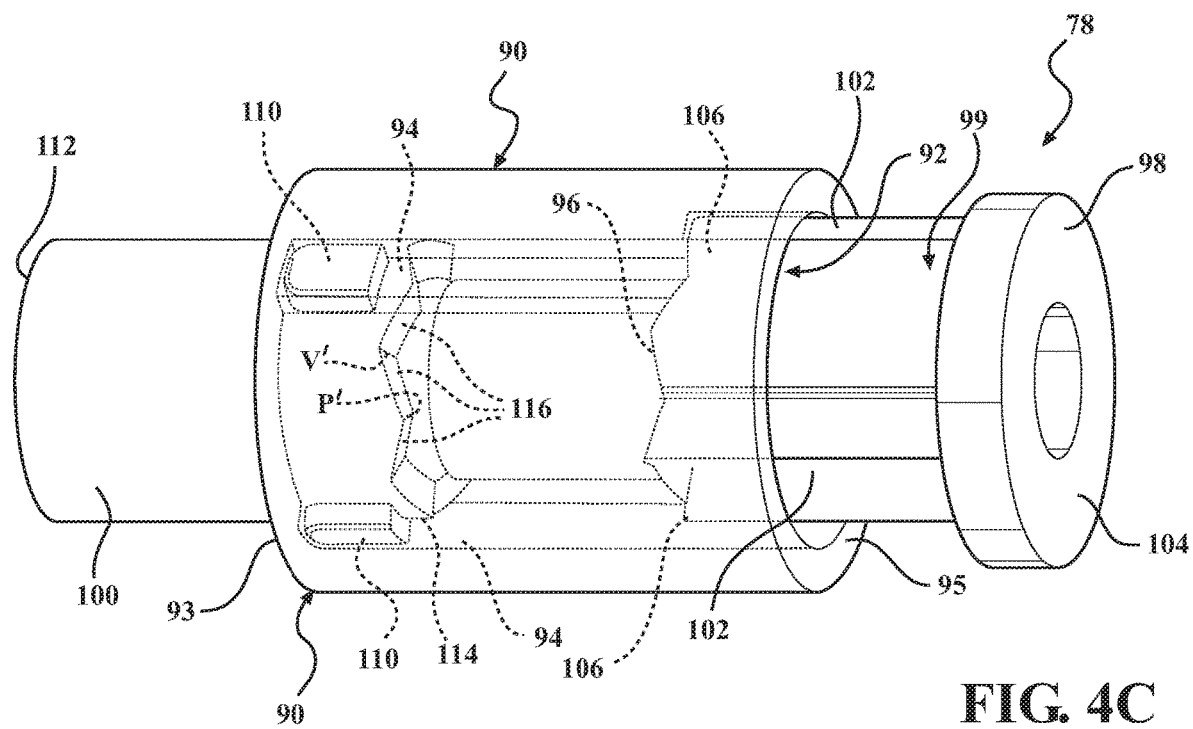
FIG. 4C is a view similar to FIG. 4A showing the powertrain actuator operating in a de-energized, connected state.
Figure 4D:
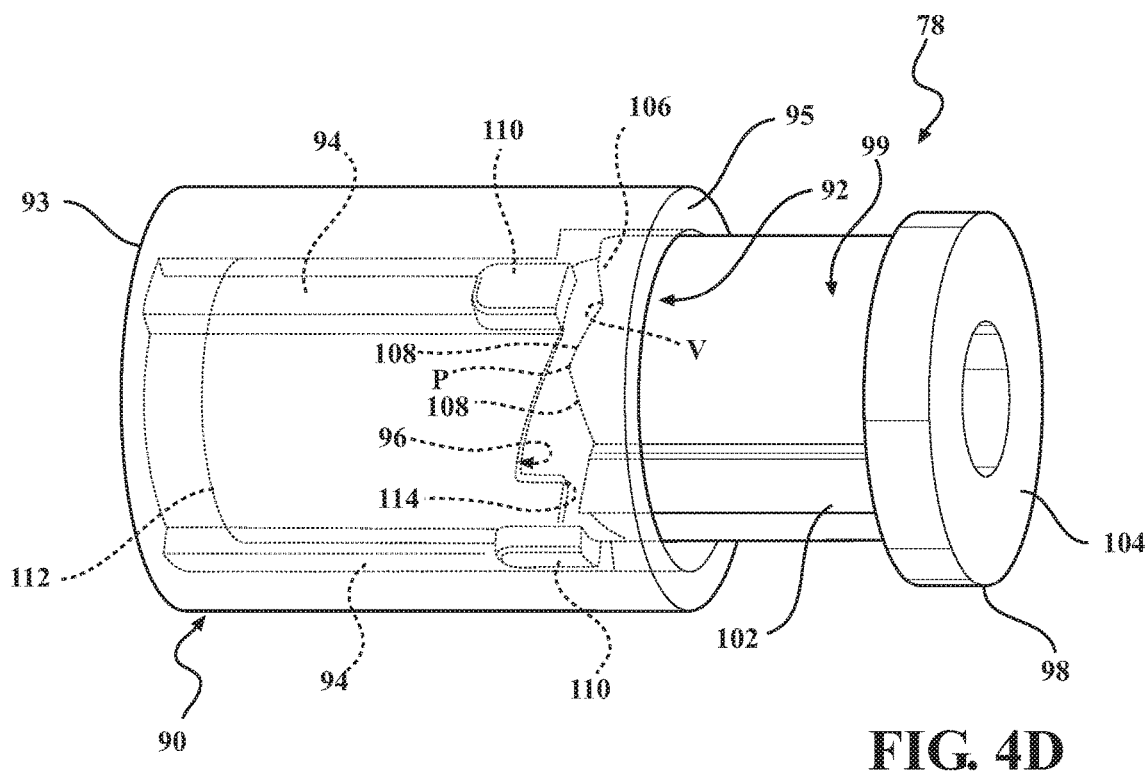
FIG. 4D is a partial schematic, perspective transparent view of the powertrain actuator of FIG. 4C operating in an energized disconnecting actuation state which returns the powertrain actuator to its de-energized, disconnected state of FIG. 4A.

Upon the first guide features 202 extending axially beyond and out of engagement from the guide member 194, the torsion applied by the drive surfaces 216 on the second activation end 214 on the mating cam surfaces 208 acts to rotatably index the tubular first member 198 and rotatably drive the cam surface 208 of the tubular first member 198 into axial alignment with helically inclined end of the guide member 194. Then, upon subsequent de-energization of the coil 67, the springs 69, 118, 120 bias the tubular first and second members 198, 200 as discussed above, such that the tubular second member 200 is returned to its home position, while the tubular first member 198 is caused to index rotatably to its engaged position to maintain the fork 64 in its coupled state. While rotatably indexing to its engaged position, the cam surface 208 of the tubular second member 200 slides along the helically inclined end of the cam lock feature 196 on the guide member 194 until the end of the cam lock feature 196 is received in the notched stop surface 203 extending axially into the cam surface 208 (FIGS. 6C, 7D), thereby maintaining the tubular first member 198 and the fork 64 in an axially translated, extended activated position, even upon the coil 67 being de-energized (FIG. 3C). While the fork 64 is in the coupled state, and while the coil 67 remains de-energized, the springs 69, 118, 120 act to maintain a compression bias on the components to prevent axial play therebetween, as discussed above and as will be understood by one skilled in the art.

When it is then desired to shift the vehicle from the four-wheel drive mode into the two-wheel drive mode, a second energization of the coil 67 can be performed to cause the tubular first and second members 198, 200 to translate within the sleeve 190 with the second guide features 210 translating along the guide member 194, whereupon the drive surfaces 216 of the second activation end 214 axially drive the cam surfaces 208 of the tubular first member 198 until the stop surfaced 203 is driven axially beyond the end of the cam lock feature 196 on the guide member 194, whereupon the cam surface 208 slides axially and rotatably along the drive surface 216 to bring the first guide feature 202 back into axial alignment with second guide feature 210 and into engagement with the guide member 194 (FIG. 7H), thereby allowing the tubular first member 198 and the fork 64 to be axially translated back to a retracted, deactivated position under the bias of the spring members 69, 120 when the coil 67 is subsequently de-energized.

The foregoing description of the various alternative embodiments has been provided for purposes of illustration and description. In particular, a powertrain actuator has been disclosed for use in moving a shift member (i.e. sleeve, fork, etc.) between two distinct positions for establishing coupled and uncoupled operating states between two rotary members. This configuration, while specifically disclosed in association with the rear disconnect devices, is intended for use in any torque transfer device associated with a power transfer assembly of the type used in motor vehicle powertrain applications. As such, this specific disclosure is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle powertrain actuator for selectively coupling a first rotatable member to a second rotatable member to transfer torque therebetween and to selectively decouple the first rotatable member from the second rotatable member to prevent the transfer of torque therebetween, comprising:
    a solenoid fixed to a wall bounding a cavity, said solenoid having an electrically activatable coil and a plunger extending between a proximal end and a distal end, said proximal end being configured for magnetic communication with said coil to cause said plunger to translate in said cavity;
    a tubular sleeve fixed in said cavity, said tubular sleeve having a throughbore with a guide member and a cam lock feature;
    a tubular first member disposed in said tubular sleeve about said plunger, said tubular first member having a first guide feature configured for translation along said guide member and having a first engagement end with a cam surface;
    a tubular second member disposed in said tubular sleeve about said plunger, said tubular second member having a second guide feature configured for translation along said guide member and having a second activation end configured to abut said first engagement end; and
    a first spring member disposed within said tubular first and second members for biasing said first and second members away from one another;
    wherein said plunger is translatable toward said coil upon a first energization of said coil for causing said tubular first and second members to translate from a retracted, deactivated position in said cavity with said first and second guide features translating along said guide member, wherein said first guide feature extends axially beyond said guide member such that said second activation end rotatably drives said first and second guide features out of axial alignment with one another and drives a stop surface of said tubular first member into engagement with said cam lock feature to maintain said tubular first member in an extended, activated position when said coil is de-energized, wherein a second energization of said coil causes said tubular first and second members to translate in said sleeve such that said second activation end drives said stop surface of said tubular first member out of engagement with said cam lock feature and brings said first guide feature into axial alignment with said guide member, thereby allowing said tubular first member to be axially translated back to its retracted, deactivated position when said coil is de-energized.

2. The vehicle powertrain actuator of claim 1, further including a second spring member disposed about said plunger between said tubular first member and said proximal end of said plunger to facilitate axial translation of said tubular first member back to its retracted, deactivated position when said coil is de-energized.

3. The vehicle powertrain actuator of claim 2, further including a third spring member disposed in abutment with said proximal end of said plunger to facilitate axial translation of said tubular first member back to its retracted, deactivated position when said coil is de-energized.

4. The vehicle powertrain actuator of claim 1, wherein said wall has a window and further including a driven member slidably disposed about said plunger and extending through said window for selectively coupling and decoupling the first rotatable member to the second rotatable member.

5. The vehicle powertrain actuator of claim 1, wherein said plunger of said solenoid is uni-directionally actuatable to move in a first axial direction via electrical power.

6. The vehicle powertrain actuator of claim 5, wherein said plunger of said solenoid is biased in a second direction opposite said first direction via at least one spring member.

7. The vehicle powertrain actuator of claim 1, wherein said first engagement end and said second activation end have inclined cam surfaces configured to abut one another to drive said first and second guide features into and out of axial alignment with one another and to drive said stop surface of said tubular first member into and out of engagement with said cam lock feature.

8. The vehicle powertrain actuator of claim 1, wherein said guide member of said tubular sleeve is a recessed channel.

9. The vehicle powertrain actuator of claim 8, wherein said first and second guide features are elongate ribs extending radially outwardly from cylindrical outer surfaces of said tubular first and second members.

10. The vehicle powertrain actuator of claim 1, wherein said guide member of said tubular sleeve is an elongate rib extending radially inwardly from an inner surface of said tubular sleeve.

11. The vehicle powertrain actuator of claim 10, wherein said second guide feature is a recessed channel extending radially inwardly into an outer cylindrical surface of said tubular second member, with the recess channel being configured for sliding receipt of said elongate rib of said tubular sleeve therein.

12. The vehicle powertrain actuator of claim 1, wherein said stop surface extends axially into said cam surface of said tubular first member.

13. The vehicle powertrain actuator of claim 1, wherein said stop surface extends along a side of said first guide feature of said tubular first member.

14. A vehicle powertrain system including a powertrain actuator for selectively coupling a first rotatable member to a second rotatable member to transfer torque therebetween and to selectively decouple the first rotatable member from the second rotatable member to prevent the transfer of torque therebetween, said powertrain actuator comprising:

a housing having a wall bounding a cavity and a through window;

an electrically activatable coil disposed adjacent said cavity;

a plunger disposed in said cavity, said plunger having an elongate portion extending between a proximal end adjacent said coil and a distal end, said proximal end being configured for magnetic communication with said electrically activatable coil to cause said plunger to translate in said cavity in response to said magnetic communication;

a tubular sleeve fixedly disposed in said cavity, said tubular sleeve having a throughbore extending between open opposite ends, said throughbore having a guide member extending axially between said open opposite ends and a cam lock feature;

a tubular first member disposed in said tubular sleeve and about said elongate portion of said plunger, said tubular first member having an outer surface with a first guide feature configured for translation along said guide member, said outer surface extending between a free end facing said proximal end of said plunger and a first engagement end facing said distal end of said plunger, said first engagement end having a cam surface and a stop surface extending therefrom;

a tubular second member disposed in said tubular sleeve and about said elongate portion of said plunger between said tubular first member and said distal end of said plunger, said tubular second member having an outer surface with a second guide feature configured for translation along said guide member and having a free end facing said distal end of said plunger and a second activation end configured to abut said cam surface on said first engagement end;

a first spring member disposed within said tubular first and second members, said first spring member biasing said first and second members away from one another;

a second spring member disposed about said plunger between said tubular first member and said proximal end of said plunger; and a driven member disposed about said plunger between said tubular first member and said second spring and extending outwardly through said window, said second spring member biasing said driven member toward said tubular first member;

wherein said plunger translates toward said electrically activatable coil upon a first energization of said coil for causing said tubular first and second members to translate in said sleeve with said first and second guide features translating along said guide member and causing said driven member to translate conjointly with said first tubular member, with said first guide feature extending beyond said guide member such that said second activation end rotatably drives said cam surface of said tubular first member and brings said stop surface into locked engagement with said cam lock feature, thereby maintaining said tubular first member and said driven member in an axially translated, extended activated position when said coil is de-energized, wherein a second energization of said coil causes said tubular first and second members to translate in said sleeve with said second guide feature translating along said guide member such that said second activation end rotatably drives said cam surface and moves said stop surface out of engagement with said cam lock feature and brings said first guide feature into alignment with said guide member, thereby allowing said tubular first member and said driven member to be axially translated back to a retracted, deactivated position when said coil is de-energized.

15. The vehicle powertrain actuator of claim 14, further including a third spring member disposed in abutment with said proximal end of said plunger to facilitate axial translation of said tubular first member back to the retracted, deactivated position when said coil is de-energized.

16. The vehicle powertrain actuator of claim 14, wherein said plunger of said solenoid is uni-directionally actuatable to move in a first axial direction via electrical power.

17. The vehicle powertrain actuator of claim 14, wherein said first engagement end and said second activation end have inclined cam surfaces configured to abut one another to drive said first and second guide features into and out of axial alignment with one another and to drive said stop surface of said tubular first member into and out of engagement with said cam lock feature.

18. The vehicle powertrain actuator of claim 14, wherein said stop surface extends axially into said cam surface of said tubular first member.

19. The vehicle powertrain actuator of claim 14, wherein said stop surface extends along a side of said first guide feature of said tubular first member.

20. The vehicle powertrain actuator of claim 14, wherein said guide member of said tubular sleeve is one of a recessed channel extending radially outwardly into an inner surface of said tubular sleeve or an elongate rib extending radially inwardly from said inner surface of said tubular sleeve.

* * * * *